(12) United States Patent
Dent

(10) Patent No.: US 7,027,454 B2
(45) Date of Patent: Apr. 11, 2006

(54) MULTI-SIGNAL TRANSMIT ARRAY WITH LOW INTERMODULATION

(75) Inventor: Paul W. Dent, Pittsboro, NC (US)

(73) Assignee: Ericcson Inc., Research Triangle Park, NC (US)

(*) Notice: Subject to any disclaimer, the term of this patent is extended or adjusted under 35 U.S.C. 154(b) by 830 days.

(21) Appl. No.: 10/007,244

(22) Filed: Nov. 13, 2001

(65) Prior Publication Data
US 2002/0080066 A1  Jun. 27, 2002

Related U.S. Application Data

(62) Division of application No. 09/055,490, filed on Apr. 6, 1998, now Pat. No. 6,377,588.

(51) Int. Cl.
    H04L 12/28 (2006.01)
(52) U.S. Cl. ...................... 370/411; 370/252; 370/395.4
(58) Field of Classification Search ........ 370/411–428, 370/252, 394, 389, 395.4; 342/354, 367
See application file for complete search history.

(56) References Cited

U.S. PATENT DOCUMENTS

| | | | |
|---|---|---|---|
| 4,105,973 A | 8/1978 | Arnold et al. | |
| 4,831,619 A | 5/1989 | Rosen | |
| 4,837,580 A * | 6/1989 | Frazita | 342/372 |
| 4,882,588 A | 11/1989 | Renshaw et al. | |
| 4,962,383 A * | 10/1990 | Tresselt | 343/700 |
| 5,060,266 A | 10/1991 | Dent | |
| 5,091,942 A | 2/1992 | Dent | |
| 5,115,248 A * | 5/1992 | Roederer | 342/373 |
| 5,132,694 A | 7/1992 | Sreenivas | |
| 5,134,417 A * | 7/1992 | Thompson | 342/373 |
| 5,148,485 A | 9/1992 | Dent | |
| 5,258,767 A * | 11/1993 | Nomoto | 343/781 |
| 5,260,935 A * | 11/1993 | Turner | 370/394 |
| 5,282,250 A | 1/1994 | Dent et al. | |
| 5,373,299 A * | 12/1994 | Ozaki | 342/373 |
| 5,390,245 A | 2/1995 | Dent et al. | |
| 5,506,904 A | 4/1996 | Sheldrick et al. | |
| 5,539,730 A | 7/1996 | Dent | |

(Continued)

FOREIGN PATENT DOCUMENTS

EP  0 420 739  4/1991

(Continued)

Primary Examiner—Steven Nguyen
(74) Attorney, Agent, or Firm—Coats & Bennett, P.L.L.C.

(57) ABSTRACT

A transmitter is provided for simultaneously transmitting a plurality of signals in a plurality of directive beams to corresponding destination stations, each destination station located in a separate fan within a service area. The transmitter includes a plurality of beamformers, each beamformer receiving one of the signals to be transmitted to an associated fan, each of the beamformers having a plurality of outputs for each different signal to be transmitted. A plurality of Butler matrices each receive one of the plurality of outputs from the plurality of beamformers for each different signal to be transmitted, each Butler matrix having a plurality of outputs in phased relationship to one another, wherein each of the signals to be transmitted is simultaneously provided across the outputs of each Butler matrix in a phased relationship. An antenna is provided with an aperture within which a two-dimensional array of antenna elements are disposed, wherein equal fractions of adjacent antenna elements are connected to the outputs of each Butler matrix, and wherein each of the plurality of signals are simultaneously transmitted by the entire two-dimensional array of antenna elements. Each of the plurality of beamformers receives steering control signals for steering the direction of each beam within its respective fan.

9 Claims, 13 Drawing Sheets

U.S. PATENT DOCUMENTS

| | | | |
|---|---|---|---|
| 5,548,295 A * | 8/1996 | Lo Forti | 342/373 |
| 5,548,813 A | 8/1996 | Charas et al. | |
| 5,555,257 A | 9/1996 | Dent | |
| 5,559,886 A | 9/1996 | Dent et al. | |
| 5,563,606 A * | 10/1996 | Wang | 342/354 |
| 5,566,168 A | 10/1996 | Dent | |
| 5,568,088 A | 10/1996 | Dent et al. | |
| 5,574,967 A | 11/1996 | Dent et al. | |
| 5,594,941 A | 1/1997 | Dent | |
| 5,619,210 A | 4/1997 | Dent | |
| 5,619,503 A | 4/1997 | Dent | |
| 5,638,024 A | 6/1997 | Dent et al. | |
| 5,648,784 A * | 7/1997 | Benedicto Ruiz | 342/373 |
| 5,708,716 A | 1/1998 | Tisdale et al. | |
| 5,734,349 A * | 3/1998 | Lenormand et al. | 342/373 |
| 5,754,139 A * | 5/1998 | Turcotte | 342/373 |
| 5,790,070 A * | 8/1998 | Natarajan | 342/354 |
| 5,812,089 A * | 9/1998 | Locke | 342/373 |
| 5,825,762 A * | 10/1998 | Kamin | 342/373 |
| 5,859,835 A * | 1/1999 | Varma et al. | 370/412 |
| 5,977,907 A * | 11/1999 | Gross | 342/354 |
| 6,104,343 A * | 8/2000 | Brookner | 342/373 |
| 6,157,621 A * | 12/2000 | Brown et al. | 370/394 |

FOREIGN PATENT DOCUMENTS

| | | | |
|---|---|---|---|
| EP | 0474977 | * | 3/1992 |
| EP | 0 484 662 | | 5/1992 |
| EP | 0 543 644 | | 5/1993 |
| EP | 0 624 008 | | 11/1994 |
| EP | 0 639 035 | | 2/1995 |
| EP | 0 767 555 | | 4/1997 |
| EP | 0 803 930 | | 10/1997 |
| FR | 2 728 366 | | 6/1996 |
| FR | 2 751 494 | | 1/1998 |
| GB | 2 316 838 | | 3/1998 |
| WO | WO 93/09614 | | 5/1993 |

\* cited by examiner

MULTI-SIGNAL TRANSMIT ARRAY WITH LOW INTERMODULATION

This is a division of Application No. 09/055,490, filed Apr. 6, 1998 now U.S. Pat. No. 6,377,588.

TECHNICAL FIELD OF THE INVENTION

The present invention is directed toward an active phased array transmitter for transmitting multiple signals and, more particularly, toward an active phased array transmitter for simultaneous transmission of multiple signals with a minimum of intermodulation distortion between signals.

BACKGROUND OF THE INVENTION

Transmitters having active phased array antennas, i.e., phased array transmitters, are commonly used in the transmission of signals. Active phased array transmitters can be configured to transmit signals in highly directive beams by using multiple antenna elements each connected to an elementary transmitter power amplifier. The signals are fed through each power amplifier and are relatively phased to achieve constructive addition of radiation in the desired direction. When only a single signal is to be transmitted in a single beam, class-C single frequency power amplifiers may be efficiently utilized. The transmitted spectrum can then be determined from the phase modulation characteristics of the information modulated on the signal.

Phased array transmitters may also be configured to transmit multiple signals in multiple directed beams. In this case, combinations of the multiple signals to be transmitted are formed by a beamforming network using a set of beamforming coefficients. The signal combinations are fed to elementary transmit power amplifiers, with each power amplifier associated with a respective antenna element or subgroup of antenna elements. In this case, the power amplifiers must be linear, multiple signal power amplifiers, also known as Multiple Carrier Power Amplifiers or MCPA's. However, a problem with this prior art configuration is that imperfect MCPA linearity causes nonlinear distortion or intermodulation between the signals generating unwanted signals. These unwanted signals may lie outside the allocated frequency band, potentially interfering with other services. Even when each signal alone, and thus their linear combinations formed by a beamformer, are band limited, the non-linearly amplified combinations will exhibit out-of-band spectral components due to the non-linear distortion.

Improvements to such prior art active phased array transmitters for transmitting multiple signals in multiple beams while reducing intermodulation and improving efficiency are described in U.S. Pat. Nos. 5,548,813; 5,555,257; 5,568,088; 5,574,967; 5,594,941; 5,619,210; 5,619,503; and 5,638,024, all of which are herein incorporated by reference. The afore-listed patents are principally directed toward improving the efficiency of use of a phased array antenna and/or improving the intermodulation and efficiency performance of MCPA's used in phased array antennas. While the afore-listed patents are not principally directed toward reducing intermodulation radiation in unauthorized frequency bands, they may provide guidance.

While a single-signal phased array for transmitting a signal in a highly directive beam may of course be provided in multiple copies in order to transmit multiple signals, the total aperture area of the plurality of single-signal antenna arrays is inefficiently used since only a fraction of the antenna elements are used to radiate each signal. For instance, if two single-signal phased array antennas were used, each would use one-half of the total antenna elements; if four single-signal phased array antennas were used, each would use only one-fourth of the total antenna elements; etc. There is thus a need for a transmitter having an active phased array antenna which employs all antenna elements to radiate each directive beam in order to obtain the full directed gain of which the total antenna aperture area is capable, while avoiding excessive inter-modulation. Further, there is a need for a transmitter having an active phased array antenna useful in a situation where no MCPA of reasonable efficiency at the current state of the art can meet the stringent limits imposed on out-of-band intermodulation radiation, thus necessitating the use of single-carrier amplifiers while still allowing multiple signals to be radiated by the antenna element array.

The present invention is directed toward overcoming one or more of the above-mentioned problems.

SUMMARY OF THE INVENTION

An active phased array transmitter is provided by disposing antenna elements on a plane or curved surface along first and second dimensions angled relative to one another forming an active phased array antenna. Antenna elements in the same row lying along the first dimension are coupled by a row-associated Butler matrix to provide a number of drive ports to which transmit power amplifiers may be connected, with successive drive ports of the Butler matrix corresponding to successive, adjacent beam directions in the plane of the first dimension in which a signal fed to the port will be radiated. Each row of antenna elements is thus capable of radiating a number of fan-shaped beams, with the fan's wide dimension being in a plane perpendicular to the row of antenna elements, while its narrow dimension is in the plane of the antenna element row.

A first set of transmit power amplifiers is connected to corresponding drive ports of Butler matrices in different rows, a corresponding drive port being one which radiates the signal supplied to it in a fan beam in the same plane as the fan beam from a corresponding drive port of another row. The set of power amplifiers is thus arranged along the second dimension, i.e., the opposite dimension to that of the Butler matrix connections, and may thus be referred to as a column of amplifiers. Other sets of amplifiers may be connected to other columns of corresponding drive ports.

Each column of amplifiers is connected to a corresponding beamformer having an input for a signal to be radiated, a set of outputs connected to the inputs of its respective amplifier column and a phase control input to control the relative phasing of the outputs such that the fan beams radiated by different rows add constructively in only a limited angular portion within the wide dimension of the fan, thus reducing the fan beams to a spot beam which has a narrow bandwidth in both dimensions. The direction of the spot beam may be steered in the second dimension, i.e., perpendicular to the antenna element rows, by means of the phase control input, while the spot beam direction along the first dimension may be selected by routing the signal to be radiated, via a router, to an appropriate beamformer. Through use of such a transmitter, all of the elements of the phased array antenna are used to form each radiated beam, while the antenna array simultaneously radiates n different signals in different beam directions using amplifiers that only amplify a single signal at a time.

In one implementation, the above-described active phased array transmitter is borne on an orbiting satellite for communicating information to and/or between multiple user terminals located at different positions on the earth. Information to be transmitted to a given user terminal modulates a signal that is routed to the appropriate beamformer and amplifier column that is able to form a beam anywhere in a fan passing through that user terminal. The control input to the beamformer is used to select the direction within that fan corresponding to the user terminal's exact location. Simultaneously, other columns of power amplifiers may be used to transmit to other user terminals that are located anywhere within different fans. Thus, simultaneous transmission to multiple user terminals is permitted so long as they lie in different fans. A scheduler or router groups and selects signals or information packets for simultaneous transmission such that two transmissions are never needed in the same fan at the same time. Multiple user terminals lying in the same fan are selected to be served with information at sequential times, i.e., using time-sharing or Time Division Multiple Access. The grouping may be performed with the aid of a location-related address contained with the header of data packets intended for each user terminal.

When the satellite is in a non-geostationary orbit, such as a low earth orbit, it moves rapidly relative to the earth such that the transmitted signal beams sweep across the earth at several kilometers per second. Thus, the selection of beamformer columns, via the router, and the beamformer control signals must be altered as a function of time in order to ensure that data packets transmitted to the same stationary user terminal at different times are correctly directed to the same location on the earth. This is facilitated by arranging the direction of electronic beam steering, effected with the aid of the beamformer control signals, to be along or parallel to the satellite's ground track, while the direction of selective beam steering, by selection of the appropriate beamformer column via the router, to be in a direction at right angles to the satellite's ground track. The beamformers may then be continuously controlled by means of a timer to compensate for orbital velocity such that, to a first order approximation, spot beams continue to be directed to fixed terrestrial locations. Due to geometrical distortions, correcting for satellite movement by routing the signal to a different beamformer to serve a particular terrestrial location is still needed, but less often than if the direction of selective beam steering was in the less favorable direction of the orbital velocity or ground track.

In another implementation, each antenna element is a dual-polarization element having two inputs and capable of radiating signals at different polarizations simultaneously, for example, horizontal and vertical or left and right hand circular polarization. One set of Butler matrices connects rows of elements using their inputs for the first polarization, and another set of Butler matrices connects rows of elements using their inputs for the second polarization. Corresponding ports of Butler matrices for the same polarization are connected to a respective column of power amplifiers and associated beamformers. In this manner, the same array of antenna elements may be used to create 2n simultaneous directive transmissions where n is the number of columns of power amplifiers provided for each polarization, while each amplifier need only amplify a single signal. The waveform of such signals may be chosen to be of constant envelope with the information modulating only the signal phase, such that efficient class-C amplifiers may be used and operated at saturation without causing signal distortion.

A feature of the transmitter is the simultaneous transmission of multiple signals while employing single-signal amplifiers to reduce unwanted out-of-band radiation due to intermodulation distortion.

Another feature of the transmitter is improved efficiency of transmission using multiple, directive beams to transmit information to user terminals at different locations on the earth.

Other aspects, objects and advantages can be obtained from a study of the application, the drawings, and the appended claims.

DETAILED DESCRIPTION OF THE PREFERRED EMBODIMENTS

Figure 1:
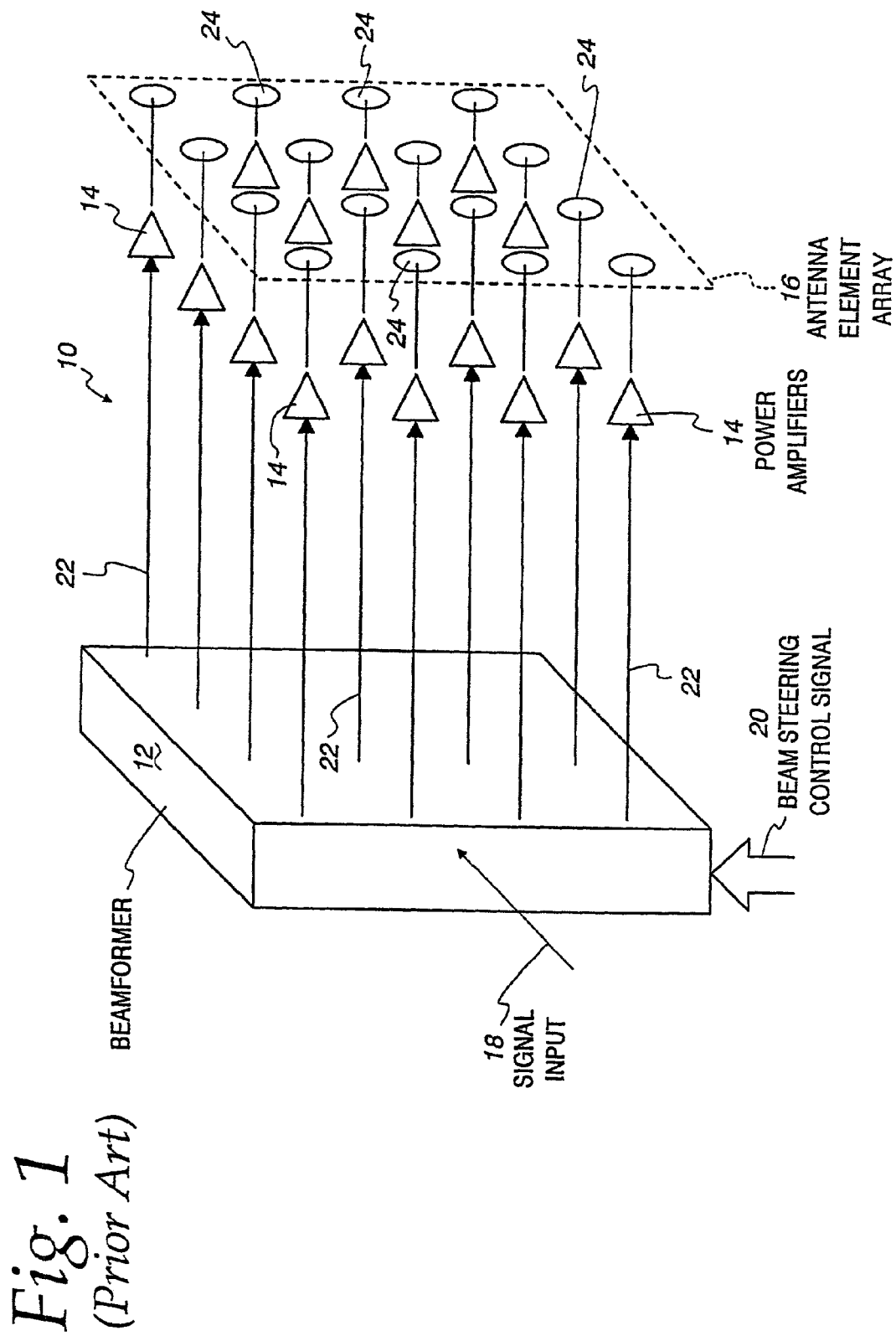
FIG. 1 depicts a prior art transmitter including a single-signal active phased array antenna.

FIG. 1 illustrates a prior art transmitter, identified generally as 10, for transmitting a single signal. The transmitter 10 includes a beamformer 12, a plurality of power amplifiers 14 and an antenna element array 16. The beamformer 12 has a single input for a single signal 18 to be transmitted, and a beam steering control signal input 20 for determining directions of transmission. The beamformer 12 receives the input signal 18 and generates a number of output signals 22 for driving the power amplifiers 14, with each output signal 22 having a phase relative to the other output signals 22 determined by the beam steering control input signal 20.

Each power amplifier 14 is connected to a respective one of antenna elements 24 in the antenna element array 16. Each of the antenna elements 24 can alternatively be a sub-array of several elements 24 connected in a predetermined manner. By altering the relative phasing of the output drive signals 22, via the beamformer control signal 20, the direction in which the desired signal radiation is reinforced may be varied, thereby varying the direction of the maximum antenna radiation. In the prior art transmitter 10 shown in FIG. 1, only a single signal 18 at a time is amplified by amplifiers 14, such that no intermodulation between signals at different frequencies arises. The single signal 18 transmitted may be deliberately chosen to be a constant amplitude signal modulated only in phase with information, such that amplifiers 14 do not need to be of a linear type, but rather may be an efficient class-C type. While not shown in FIG. 1, the radiated spectrum is then conventionally determined by filtering the phase modulation used to impress the information on the transmitted signal, and is not distorted or degraded by the amplifiers 14.

Figure 2:
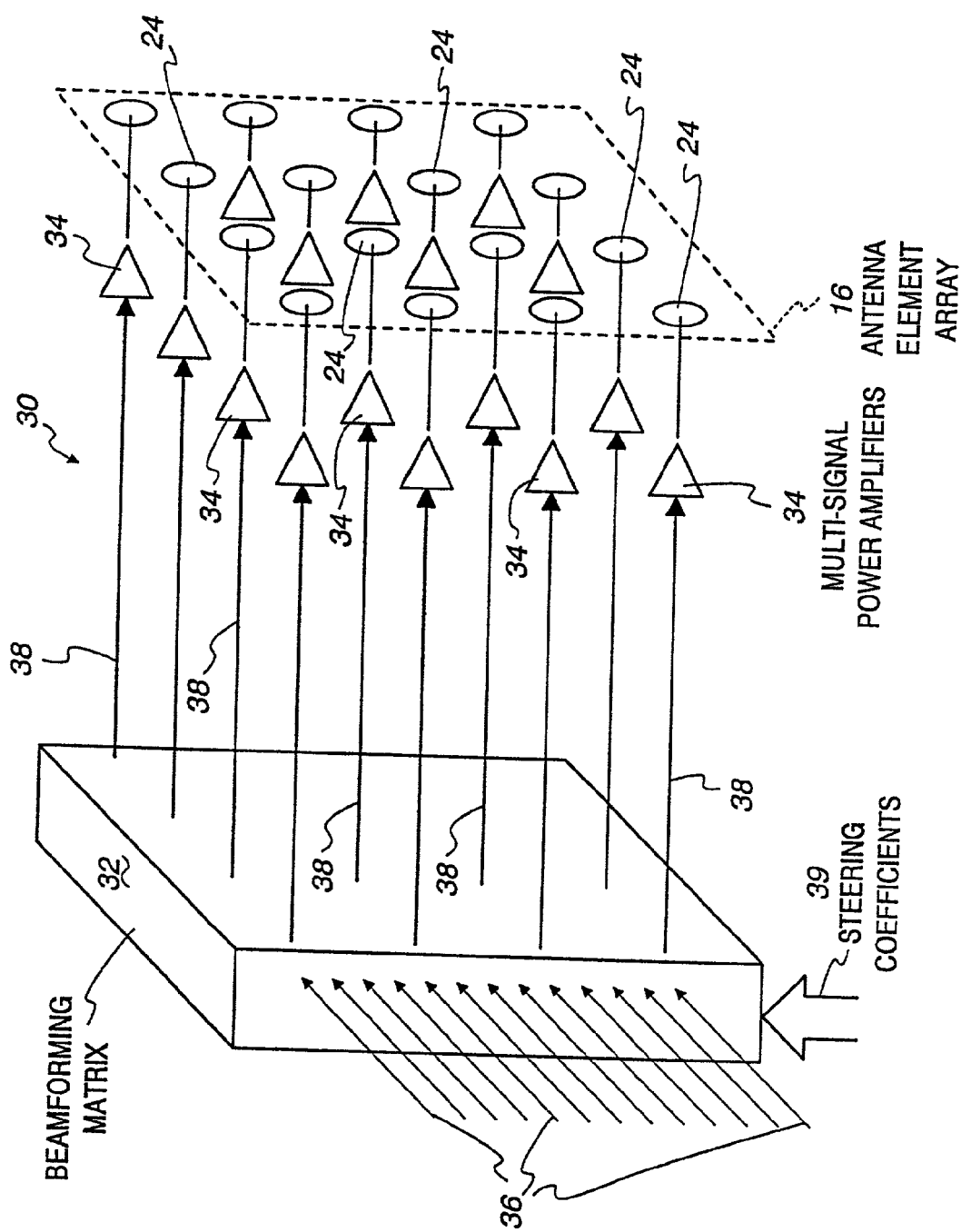
FIG. 2 depicts a prior art transmitter including a multiple-signal active phased array antenna.

FIG. 2 illustrates a prior art phased array transmitter, indicated generally as 30, for transmitting multiple signals. The transmitter 30 includes a beamforming matrix 32, a plurality of multi-signal power amplifiers 34, and the antenna element array 16 as previously described with respect to FIG. 1. Beamforming matrix 32 has multiple inputs for multiple signals 36 to be transmitted. The beamforming matrix 32 generates output signals 38 which are linear combinations of the input signals 36 using a matrix of weighted beam steering coefficients 39 that determines the direction in which maximum radiation will occur independently for each signal 36. The output linear combinations 38 are amplified by multi-signal power amplifiers 34, which are connected to corresponding elements 24 of the antenna element array 16. The multi-signal power amplifiers 34 must be of a linear type that faithfully reproduce both a varying amplitude and a varying phase, since a linear combination of signals has a widely varying amplitude even when each signal alone is of constant amplitude.

Departures from ideal linearity in the power amplifiers 34 cause inter-modulation distortion between the different output signals 38, producing unwanted distortion products. The unwanted distortion products, known as third order intermodulation, are at frequencies such as $2f_1-f_2$ or $f_1+f_2-f_3$, where $f_1$, $f_2$ and $f_3$ are the individual signal center frequencies. If the center frequencies are all identical, then intermodulation occurs on top of the desired signal and on either side. Intermodulation that lies only on top of other desired signals is known as "in-band intermodulation" and one is free to determine the level of acceptable in-band intermodulation.

On the other hand, when $f_1$ lies near one edge of an authorized frequency band and $f_2$ lies near the other edge, intermodulation at $2f_1-f_2$ and $2f_2-f_1$ will lie outside the authorized band, and must be suppressed sufficiently to avoid interference with users of the adjacent frequency bands, known as "out-of-band intermodulation". One is not free to determine the acceptable level of out-of-band intermodulation without reference to other potential users. Various regulatory bodies such as the FCC in the USA will usually determine the limits for out-of-band intermodulation based on the envisaged use for the adjacent frequency bands. In some cases, it may be very difficult to meet the regulatory requirements utilizing the prior art transmitter 30 shown in FIG. 2 without excessive loss of efficiency in the power amplifiers 34.

Figure 3:
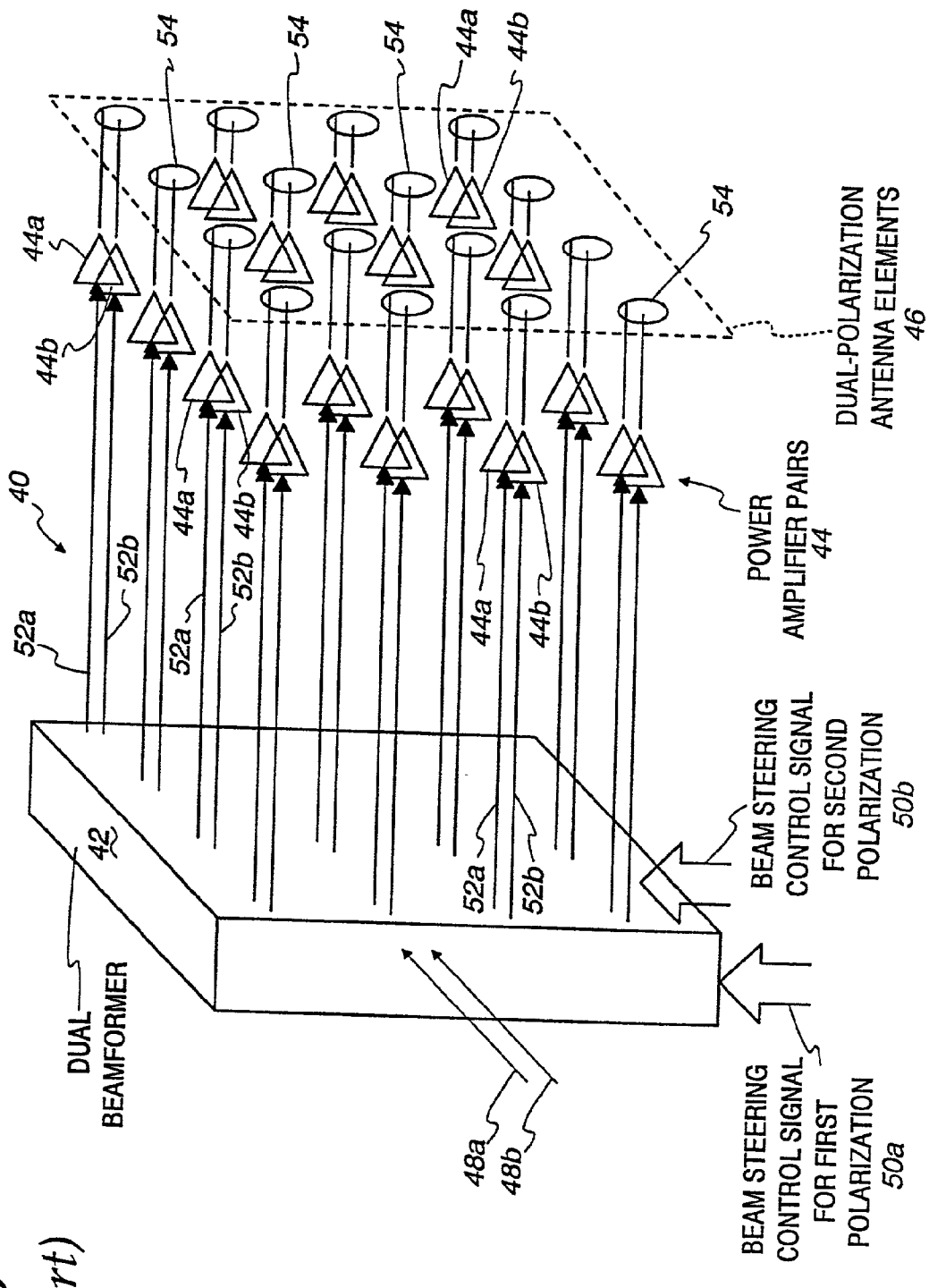
FIG. 3 depicts a prior art transmitter including a dual-polarization active phased array antenna for radiating one signal per polarization.

A conventional technique for meeting more onerous intermodulation suppression requirements while transmitting more than one signal at a time is through the use of dual-polarization. FIG. 3 illustrates such a dual-polarization transmitter, indicated generally as 40. The concept of dual-polarization is to transmit a first signal using one polarization, for example Right Hand Circular Polarization (RHC) using a first set of power amplifiers driven by a first beamformer for directing a first radiated signal beam, and to transmit a second signal using a second polarization, for example a Left Hand Circular Polarization (LHC) with the aid of a second beamformer and second set of power amplifiers. It should be noted that vertical and horizontal polarization may also be implemented.

The dual-polarization transmitter 40 shown in FIG. 3 includes a dual-polarization beamformer 42, a plurality of power amplifier pairs 44, and a dual-polarization antenna element array 46.

The dual beamformer 42 includes inputs for two input signals 48a, 48b to be radiated simultaneously, and first and second steering control inputs receiving beam steering control signals 50a, 50b for the first and second polarizations, respectively. The dual beamformer 42 receives input signals 48a, 48b and generates output drive signals 52a, 52b driving amplifier pairs 44a, 44b, with each amplifier 44a or 44b of each pair receiving only a single signal to be radiated with a given polarization. Antenna elements 54 within the dual-polarization antenna element array 46 may be dual-polarized elements such that the same antenna array 46 may be used to transmit both polarizations simultaneously. It should be realized, however, that the above-described prior art transmitter 40 is limited to simultaneously forming only two beams, as there are only two independent (orthogonal) polarizations available.

Figure 4:
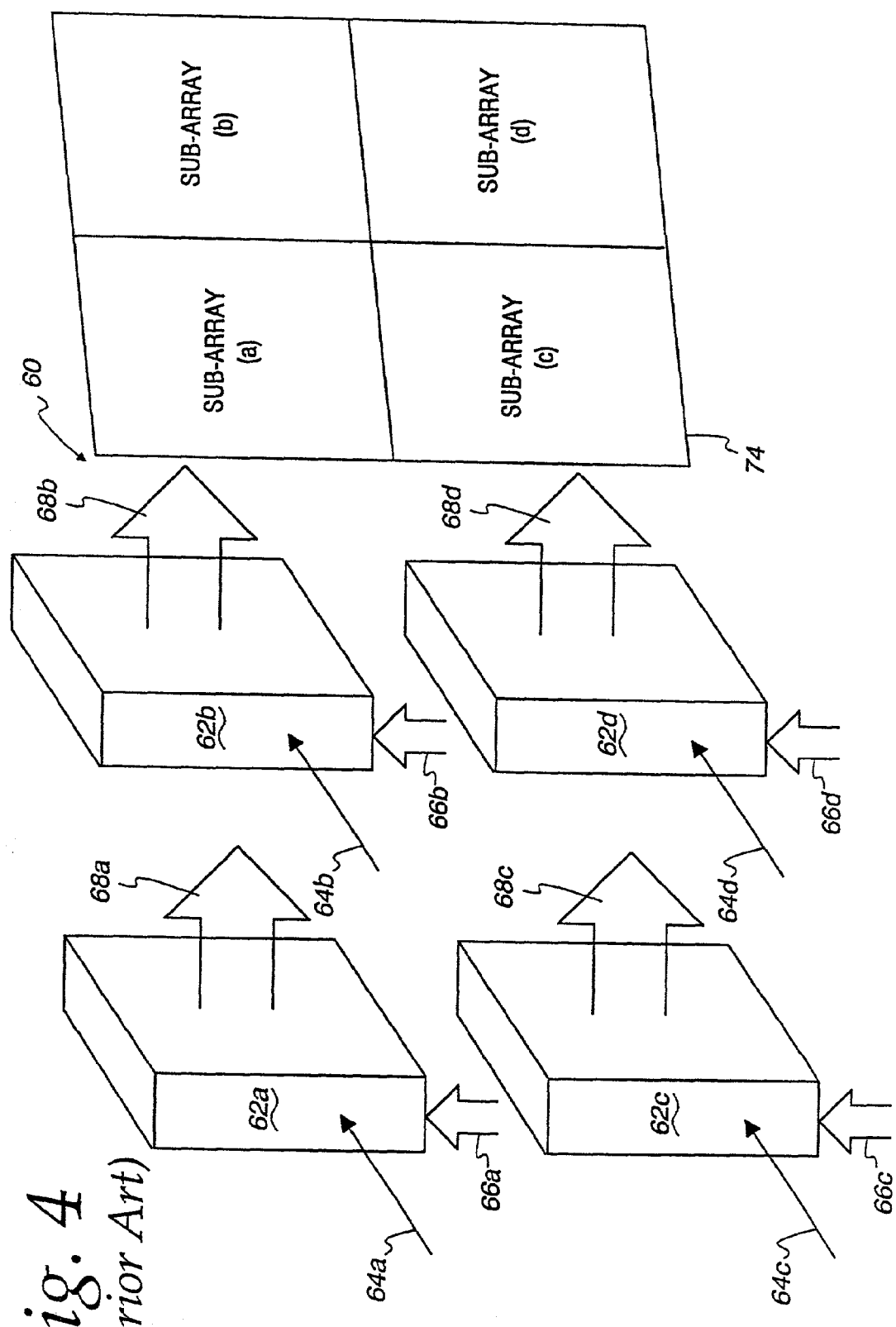
FIG. 4 depicts multiple copies of the prior art transmitter of FIG. 1 for multiple signal transmission.

FIG. 4 depicts a prior art transmitter, indicated generally as 60, utilizing multiple single polarization prior art transmitters (as shown in FIG. 1) to transmit more than two signals in different directions at the same time. The transmitter 60 includes four beamformers 62a, 62b, 62c, 62d which are used to independently steer each of four different input signals 64a, 64b, 64c, 64d via beam steering control signals 66a, 66b, 66c, 66d input to the respective beamformers.

The output drive signals 68a, 68b, 68c, 68d produced by the beamformers 62a, 62b, 62c, 62d drive corresponding sub-arrays (a–d) including single-signal amplifiers and antenna elements in a manner as previously described with respect to FIG. 1. These four sub-arrays (a–d) are each a sub-section of the whole array aperture 74, and thus each beam is formed using only one-fourth of the total antenna aperture area 74, resulting in inefficient use of the available aperture 74.

If each beam had used the whole aperture 74, the beam directivity would have been 6 dB more, that is a beam of four times the peak power, allowing the power amplifiers to be of one-fourth the power level. This saving in power is extremely important in orbiting satellites as all power must be collected by large solar cell arrays. Furthermore, heat dissipation in the vacuum of space is problematic. Although the prior art transmitter 60 of FIG. 4 was described utilizing single polarization sub-arrays (a–d), dual-polarization arrays, as described with respect to FIG. 3, may be implemented to essentially double the number of signals transmitted by the transmitter 60.

Figure 5:
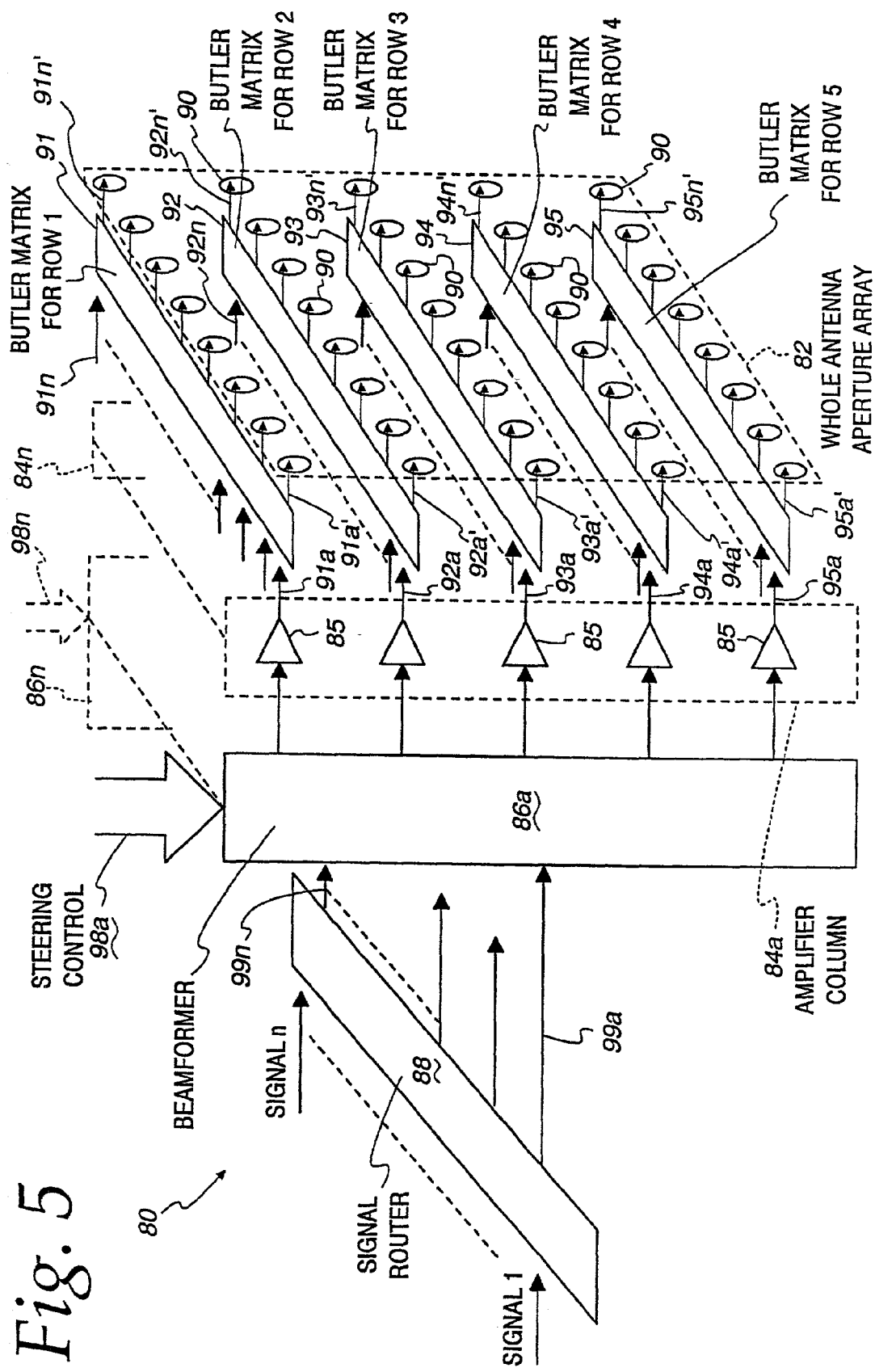
FIG. 5 depicts one embodiment of an active phased array transmitter according to the present invention.

FIG. 5 depicts a transmitter, indicated generally as 80, for transmitting multiple independently steerable beams using the whole antenna array aperture. The transmitter 80 includes an antenna aperture array 82, columns 84a–84n of power amplifiers 85, beamformers 86a–86n, and a signal router 88. The antenna aperture array 82 includes antenna elements 90 grouped in rows, with each row connected to a respective passive coupler or Butler matrix, and more specifically, matrix 91 for row one, matrix 92 for row two, matrix 93 for row three, matrix 94 for row four, and matrix 95 for row five. The Butler matrices 91–95 each have a number of inputs, usually but not necessarily equal to the number of outputs connected to the antenna elements 90.

Each of the Butler matrix inputs are indicated with the corresponding Butler matrix reference number followed by a–n, while each of the Butler matrix outputs are indicated with the corresponding Butler matrix reference number followed by a'–n'.

Each input signal to each Butler matrix is split between the outputs in a manner different from, and orthogonal to, the manner in which signals at the other inputs are split. For instance, input signal 91a is split across outputs 91a'–91n' in a first manner; input 91b is split across outputs 91a'–91n' in a second manner; etc.

In the simplest form of a two-input, two-output Butler matrix, a signal presented to the first input maybe split in two, in-phase, half-power copies at the outputs, while the signal presented at the second input is split out-of-phase.

A four-input, four-output Butler matrix splits the signals presented at respective inputs in the phase-sequences:

|  | Output Phases |  |  |  |
|---|---|---|---|---|
| Input 1: | 0° | 0° | 0° | 0° |
| Input 2: | 0° | 90° | 180° | 270° |
| Input 3: | 0° | 180° | 360° | 540° |
| Input 4: | 0° | 270° | 540° | 810° |

The signals to successive inputs split with a phase incremented successively through multiples of an incremental phase; in the above example the phase increments are a multiple of 90°. The incremental phase shift being 0° for Input 1, 90° for Input 2, 180° for Input 3, and 270° for Input 4.

Referring again to FIG. 5, the Butler matrices 91–95 are eight-input, eight-output Butler matrices which accordingly use phase increments which are a multiple of 45°. More specifically, the Butler matrices 91–95 split the signals presented at respective inputs in the following phase-sequences:

|  | Output Phases |  |  |  |  |  |  |
|---|---|---|---|---|---|---|---|
| Input 1: | 0° | 0° | 0° | 0° | 0° | 0° | 0° | 0° |
| Input 2: | 0° | 45° | 90° | 135° | 180° | 225° | 270° | 315° |
| Input 3: | 0° | 90° | 180° | 270° | 360° | 450° | 540° | 630° |
| Input 4: | 0° | 135° | 270° | 405° | 540° | 675° | 810° | 945° |
| Input 5: | 0° | 180° | 360° | 540° | 720° | 900° | 1080° | 1260° |
| Input 6: | 0° | 225° | 450° | 675° | 900° | 1125° | 1350° | 1575° |
| Input 7: | 0° | 270° | 540° | 810° | 1080° | 1350° | 1620° | 1890° |
| Input 8: | 0° | 315° | 630° | 945° | 1260° | 1575° | 1890° | 2205° |

While an eight-input, eight-output Butler matrix is shown in FIG. 5, it should be understood that Butler matrices of any order can be utilized without departing from the spirit and scope of the present invention. Butler matrices can be produced by suitable stripline or waveguide structures. Waveguide Butler matrices may be constructed economically by injection molding of plastic, which is subsequently metallized to form the conducting waveguide cavities.

Figure 6:
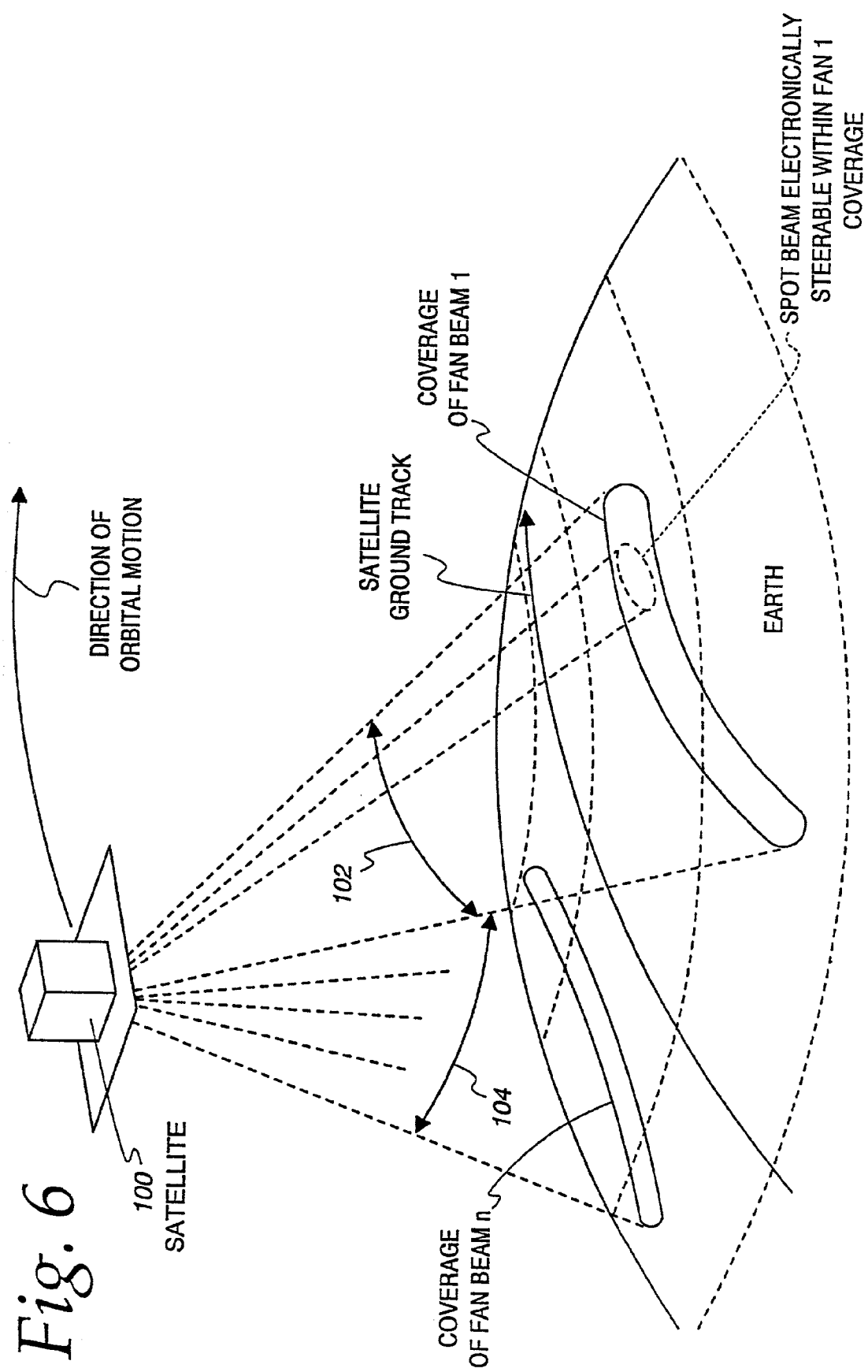
FIG. 6 illustrates the preferred orientation of the active phased array transmitter on an orbiting satellite.

Each signal input to Butler matrix inputs 91a–91n, 92a–92n, etc., is transmitted by the associated row of antenna elements 90 connected to its outputs 91a'–91n', 92a'–92n', etc. with a fan-shaped radiation beam 1-n as shown in FIG. 6. Different Butler matrix inputs produce fan beams at different angles as illustrated by fan 1, fan 2, . . . fan n of FIG. 6, which will be described in greater detail below.

Referring back to FIG. 5, a first column 84a of amplifiers 85 is connected to the first inputs 91a–95a of each Butler matrix 91–95, that is to the inputs which produce the same fan angle from every row. When all the amplifiers 85 are excited with a signal in the appropriate relative phasing, radiation from all the rows 1–5 will add constructively in only one direction within fan 1 (see FIG. 6), thus creating a spot beam. The location of the spot beam within fan 1 (see FIG. 6) may be controlled by varying the beam steering control signal 98a input to beamformer 86a.

Similarly, there are columns 84b–84n of amplifiers 85, with associated beamformers 86b–86n, connected to the other Butler matrix inputs namely, inputs b, c, . . . n, which are not fully shown in FIG. 5 to preserve clarity. More specifically, the number of amplifier columns 84a–84n and beamformers 86a–86n depends on the number of inputs to the Butler matrices 91–95. Each beamformer 86a–86n controls the direction of the spot beam within a different fan, thereby giving n independently steerable beams. Each beam is formed using all of the elements 90 of the antenna aperture array 82, while each power amplifier column 84a–84n amplifies only a single signal at a time, thus avoiding intermodulation.

It should be noted that the transmitter 80 can be configured without the plurality of amplifier columns 84a–84n, but with n power amplifiers (not shown), with each power amplifier amplifying a different signal 99a–99n input to respective beamformers 86a–86n. In this case, however, beamformers 86a–86n will have to operate on high power, amplified signal which is not preferred.

In operation, the signal router 88 receives the various signals 1-n which are to be transmitted simultaneously. To direct radiation of a signal to a given spot, the signal router 88 first determines the fan in which the spot lies, and routes that signal 99a–99n to the beamformer 86a–86n for that fan. The selected beamformer 86a–86n is electronically steered, via steering control signals 98a–98n, to effect radiation in the desired spot direction within the fan for that signal 99a–99n. The signal router 88 may thus direct radiation of one signal in each fan at a time.

Beamformers 86a–86n provide for continuous variation of the spot direction within the associated fan, while the router 88 allows selection of a fan. Thus, the transmitter 80 of FIG. 5 provides continuous beam steering in one plane with switched beam steering in the other plane.

FIG. 6 illustrates the preferred orientation of the plane of continuous, electronic steering versus the plane of switched, discrete-step steering when the transmitter 80 is used on a low earth orbiting satellite 100. The long dimension of the fans 1-n, shown by arrow 102, along which continuous steering is effected via the beamformers 86a–86n is preferably oriented along the ground track of the satellite 100; that is, in the direction of the orbital motion or velocity of the satellite 100. As shown in FIG. 6, different fans occupy different positions to the right and left of the ground track, with coverage by the two extreme fans 1 and n illustrated in FIG. 6. The switched, discrete-step steering between fans occurs in the plane or dimension generally depicted by arrow 104 and is effected by the router 88.

A spot beam directed toward a particular user terminal, as shown in the coverage region of fan 1, may then be maintained by controlling the appropriate beamformer 86a to move the beam progressively backwards in the opposite direction to the satellite's 100 motion, thus compensating for satellite movement. Due to geometrical distortions, namely that the extremes of the fan beams are farther away from the ground track than the center of the fans, it may eventually become necessary for the router 88 to switch the fan used to serve a particular user terminal. However, this switching is at a much reduced rate than if the fans had been oriented to cover regions elongated across the ground track.

In cases where the number of antenna array elements 90 in a row is large, for example greater than about 16, a Butler matrix to couple all elements in a row having sixteen inputs and sixteen outputs may become excessively large as a waveguide structure or else excessively lossy. When such a full-sized Butler matrix is used for the Butler matrices 91–95 in FIG. 5, e.g., a 16×16 Butler matrix, the number of fan-shaped sub-regions produced is sixteen and the number of beamformers 86a–86n and columns 84a–84n of independent amplifiers 85 which can be connected is also sixteen, providing the ability to radiate sixteen different signals, one per fan, using only single signal amplifiers. However, as shown in FIG. 7, the transmitter can be usefully configured to generate fewer than the maximum number of simultaneous beams.

Figure 7:
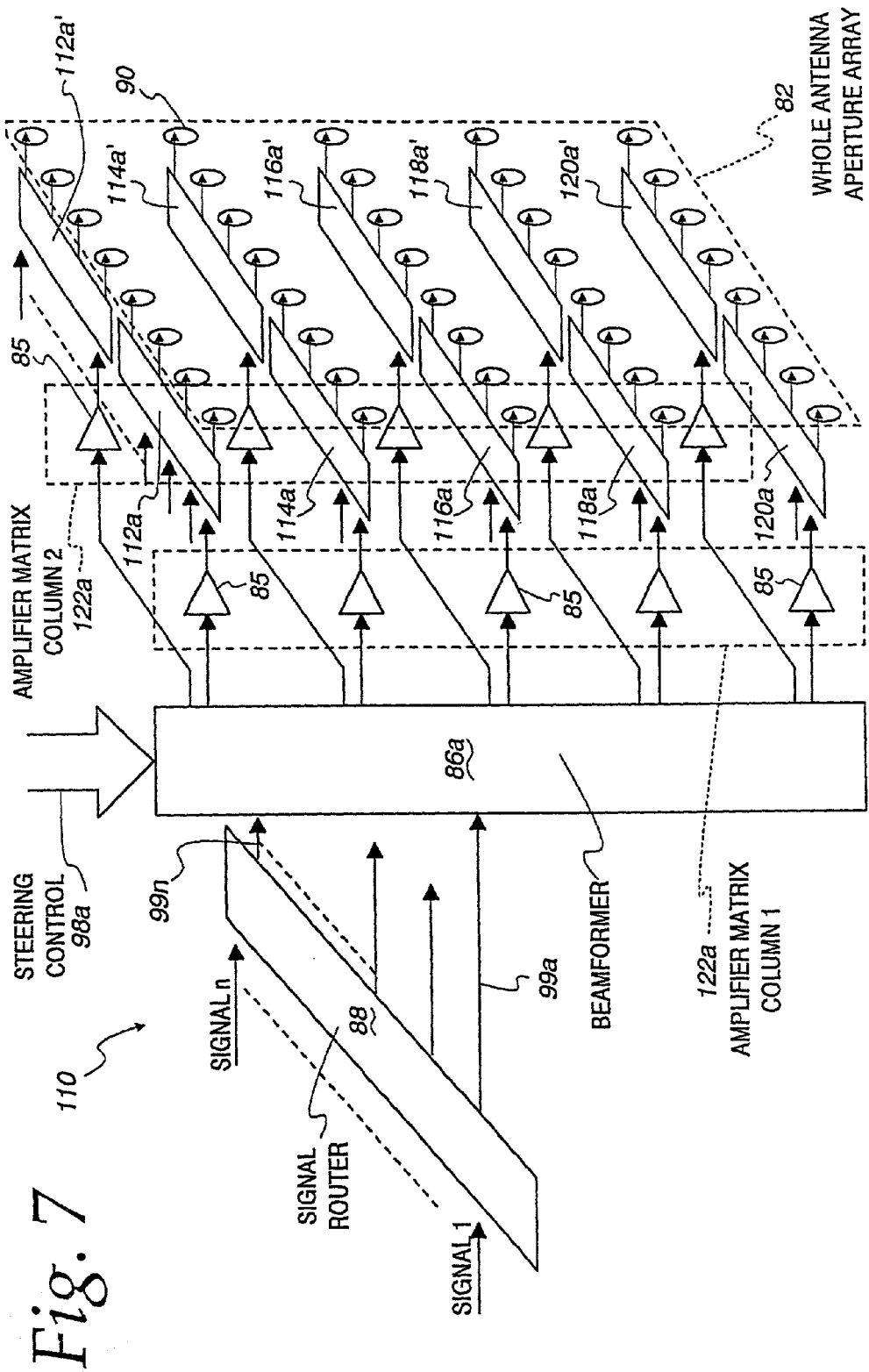
FIG. 7 depicts another embodiment of an active phased array transmitter.

FIG. 7 depicts a transmitter 110 wherein the row of Butler matrices 91–95 of FIG. 5 have been split into smaller Butler matrices. More specifically, the 8×8 Butler matrix 91 in FIG. 5 has been replaced with two 4×4 Butler matrices 112a, 112a' in FIG. 7; the 8×8 Butler matrix 92 in FIG. 5 has been replaced by two 4×4 Butler matrices 114a, 114a' in FIG. 7; etc. Similarly, in a transmitter utilizing a full size 16×16 Butler matrix, four 4×4 Butler matrices can be replaced therefore. Corresponding input ports of each Butler matrix 112a, 112a'–120a, 120a' are driven by matrices 122a–122n of amplifiers 85, with each matrix having a column of amplifiers 85 for each of the undersized Butler matrices 112a, 112a'–120a, 120a'. For clarity purposes, only beamformer 86a and amplifier matrix 122a are shown in FIG. 7.

Thus, in the transmitter 110 shown in FIG. 7, there are four amplifier matrices 122a–122n, each having two columns. In the case of sixteen row elements coupled by four, 4×4 Butler matrices, there would be four amplifier matrices, each having four columns of amplifiers, making a matrix of 4×M amplifiers, where M is the number of rows, i.e., antenna elements 90 in a column.

All amplifiers 85 of same matrix connect to corresponding inputs of all Butler matrices, i.e., to inputs number 1. Other, independent amplifier matrices may be connected to the other Butler matrix inputs number 2, 3, etc. Thus, when using 4×4 Butler matrices, four independent amplifier matrices 122a–122n may be used, allowing four independent beams to be generated using single-signal amplifiers. The use of sub-sized Butler matrices effectively produces fewer, broader fans. Beamformers 86a–86n, steering control signals 98a–98n and signal router 88 function as previously described with respect to FIG. 5, albeit there need now be only half as many beamformers 86a–86n and steering control signals 98a–98n.

The beamformers 86a–86n of FIG. 7 produce signals controlled in relative phasing down each column to produce beams steered along the fan region's largest dimension as before (see arrow 102 in FIG. 6), but now also controls the relative phasing between the different columns of amplifiers within the same amplifier matrix 122a–122n, so as to produce fine beam steering across the fan's narrow dimension in the direction of arrow 104 in FIG. 6.

Thus, in operation, the signal router 88 receives signals 1-n to be transmitted and determines the coarse fan-shaped region in which the user to which the signal is to be transmitted lies. The router 88 selects the beamformer 86a–86n and associated power amplifier matrix 122a–122n that are configured to transmit within that particular region. The beamformer 86a–86n is controlled, via steering control signals 98a–98n, to fine-steer the beam both along and across the selected region to place the peak beam directivity as close as possible to the user's location.

In FIGS. 5 and 7, the Butler matrices are connected only to elements in the same row. The Butler matrices function as partial beamformers, forming the directivity only in one plane in FIG. 5, and forming only part of the total directivity in one plane in FIG. 7. The beamformers 86a–86n complete the formation of the required directivity by forming all of the directivity in the column plane (FIG. 5), and in the case of FIG. 7 completing the formation of the directivity in the row plane.

Figure 8:
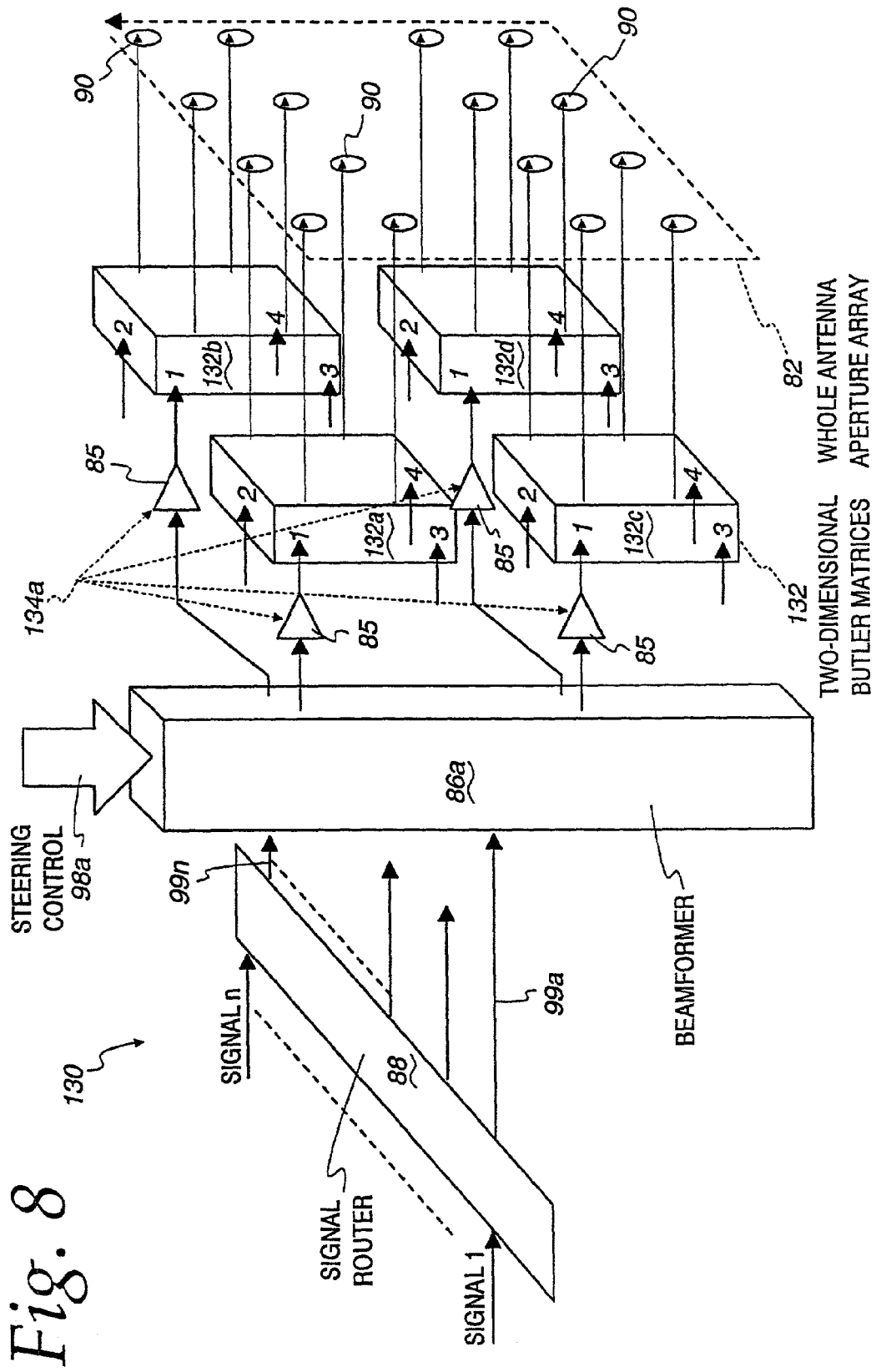
FIG. 8 depicts yet another embodiment of an active phased array transmitter.

A further embodiment of the transmitter is shown in FIG. 8. Transmitter 130 depicted in FIG. 8 includes two-dimensional Butler matrices 132a–132d which connect both row and column elements 90 of the antenna aperture array 82. FIG. 8 depicts four 2×2 two-dimensional Butler matrices 132a–132d, however, other sized matrices can be utilized without departing from the spirit and scope of the present invention. The two-dimensional Butler matrices form part of the directivity in both the row and column planes.

Each input 1, 2, 3, 4 to the Butler matrices 132a–132d include a separate power amplifier array 134a–134d including a separate single-signal power amplifier 85 for each Butler matrix 132a–132d. Similar to FIGS. 5 and 7, there are separate beamformers 86a–86d with accompanying steering control signals 98a–98d for each of the four inputs of the Butler matrices 132a–132d. For clarity purposes, only beamformer 86a and associated amplifier matrix 134a are depicted in FIG. 8. Thus, in FIG. 8 there are four beamformers 86a–86d, four steering controls signals 98a–98d, and four power amplifier arrays 134a–134d. Accordingly, the transmitter 130 in FIG. 8 is capable of transmitting four separate signals 99a–99d simultaneously.

The two-dimensional Butler matrices 132a–132d effectively perform an analog Discrete Fourier Transform (DFT) using the Fast Fourier Transform (FFT) structure. Two-dimensional FFT structures are simpler than one-dimensional FFT structures of the same number of input and output signals, and thus the configuration of the two-dimensional Butler matrices 132a–132d of FIG. 8 can be advantageous. For example, a four input, four output two-dimensional Butler matrix can be made using only 180° hybrid junctions or "Magic Tee's" in waveguide terminology. Alternatively, as shown in FIG. 9, 90° couplers, such as branch line couplers, can be used.

Figure 9:
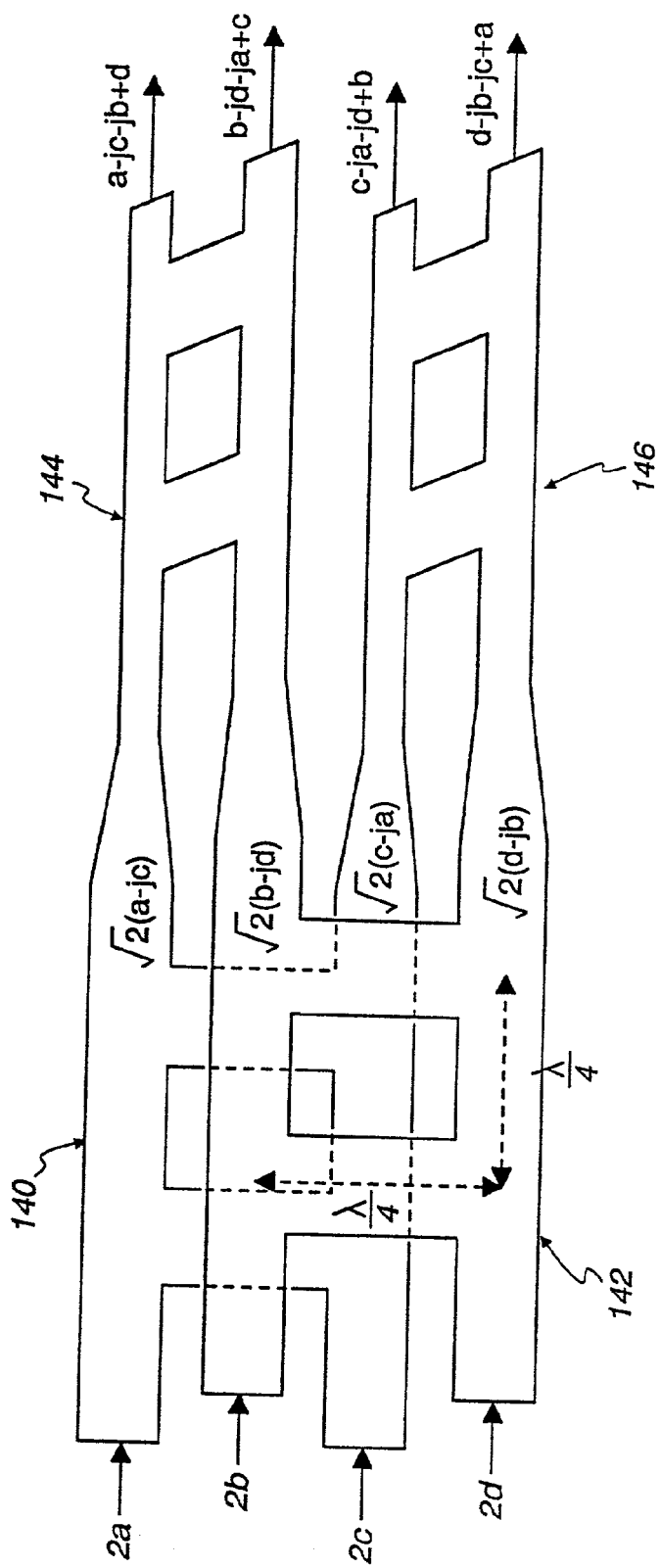
FIG. 9 illustrates voltage splitting in a 4×4 port, two-dimensional Butler matrix.

In FIG. 9, four signal voltages a, b, c, d are input on the left and are split in different combinations to form the four outputs at the right. A scaling of two at the input and root-2 after the first two couplers 140, 142 reflects conservation of energy. The four outputs from couplers 144, 146 drive a square sub-array of four antenna elements 90 in the whole array 82 of FIG. 8, such that the signals a, b, c, d are radiated respectively into each of the four quadrants of the coverage area, which, in the case of an orbiting satellite might be described as: (a) to the right of the ground track and behind the sub-satellite point; (b) to the left and behind; (c) to the right and forward of the sub-satellite point; and (d) to the left and forward.

Whichever configuration is used, the principle for directing a signal is the same as previously outlined, namely, first determining the coarse region (which are formed by the Butler matrices) in which the user lies, selecting the corresponding power amplifier, array and beamformer, then adjusting the beamformer to fine steer the beam to the user. Within other design constraints such as Butler matrix complexity and loss, preference should be given to forming coarse regions having a greater dimension along the direction of orbital motion (see arrow 102 in FIG. 6) with the narrower dimension at right angles to the satellite motion (see arrow 104 in FIG. 6), thus allowing the electronic beamformers 86a–86n to be preprogrammed to compensate for satellite motion.

In one application, the radiated signal is a wideband digitally phased modulated signal carrying bursts of high bit rate information using all of an allocated bandwidth within the radio communications spectrum. As many such signals may be radiated simultaneously as there are beamformers, that is n times, so that the entire allocated bandwidth is reused n times. When a given part of the spectrum is reused, the distance between spots in which the same spectrum is used must be sufficient to avoid self-interference, which is also co-channel interference. This is avoided if the frequency channel is reused in a second beam which is well enough away from the main lobe of a first beam. FIGS. 10A–10D show allowed and disallowed patterns of frequency reuse.

Figure 10A:
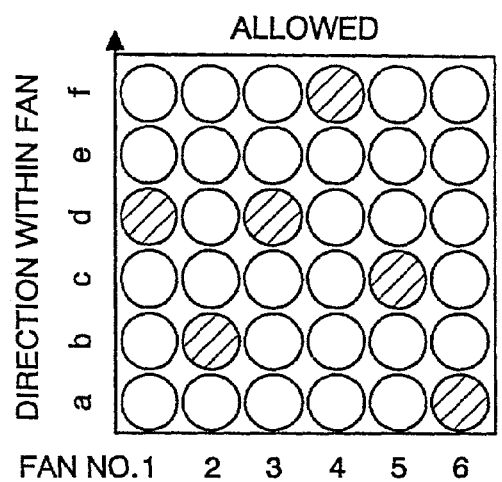
FIGS. 10A–10D illustrate allowed and disallowed spot patterns for simultaneous illumination with the active phased array transmitter.
Figure 10B:
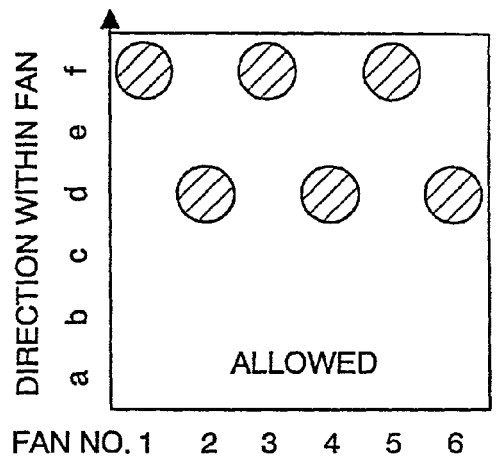

In FIG. 10A, the shaded spots indicate allowed locations of simultaneous use, as there is always at least a separation of one or more spot beam diameters between the spots in use. FIG. 10B illustrates that it is perfectly acceptable to illuminate spots that have the same coordinates, i.e., d and f, within their respective fans, providing that this does not occur in adjacent fans.

Figure 10C:
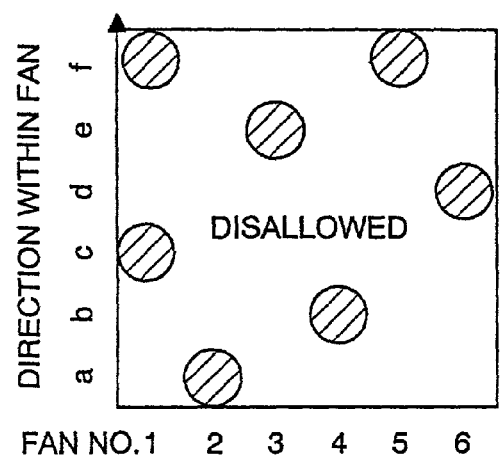

On the other hand, FIG. 10C illustrates a disallowed pattern due to having two spots (1c and 1f) in the same fan (fan 1) simultaneously. Such a spot beam pattern is not capable when single-signal power amplifiers are used to create each fan.

Figure 10D:
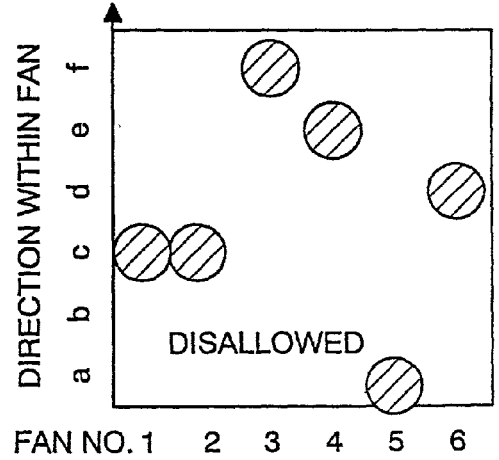

FIG. 10D shows another disallowed pattern in which spots having the same direction (c) within their respective fans occur in adjacent fans (fan 1 and fan 2). Such a separation is insufficient to avoid co-channel interference. Further, even the spot beams that are diagonally adjacent at locations 3f and 4e may be too closely spaced to avoid co-channel interference. Accordingly, the signal router 88 must queue signals for transmission to different terminals according to their locations in such a way as to utilize the inventive transmitters capability to transmit n simultaneous beams, but in such a way as to avoid violation of reuse distance criteria.

Figure 11:
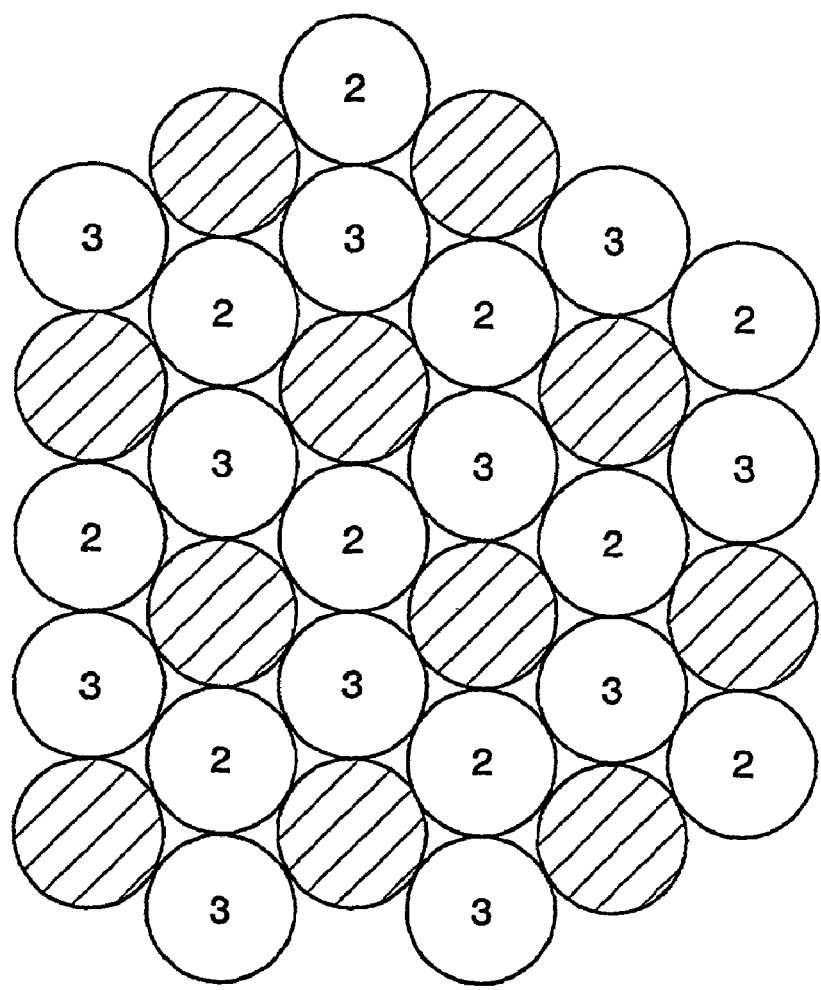
FIG. 11 illustrates reuse classes of spots for simultaneous illumination with the active phased array transmitter.

An alternative method to impose reuse distance criteria is illustrated in FIG. 11. In FIG. 11, the vertical columns of circles or spots along fans 1–6 are shown offset between adjacent columns, as is customary when discussing reuse in cellular radio systems. Reuse of a frequency channel may occur in regularly spaced places forming a reuse pattern. Different channels must be used in all other places.

FIG. 11 illustrates distributing the use of three frequency channels or three timeslots numbered 1, 2, 3 in a so-called three-cell pattern across six fans. The separation between cells, or spot beams, such as the shaded cells corresponding to channel 1, is equal to the square root of the cell pattern size (3 in this example for the three frequency channels) multiplied by the cell diameter. Thus, a larger cell pattern increases the separation between co-channel cells, reducing their mutual interferences. In the example of FIG. 11, it is assumed that a reuse pattern size of 3 reduces mutual interference to an acceptable level, and that the same channel may thus be used in all of the shaded spots simultaneously.

The inventive transmitter is, however, only capable of illuminating one spot in each vertical column or fan at a time, due to the use of single frequency power amplifiers for each fan beam. The selected spot may, however, be any of the shaded spots in the column at a given first time instant. At a second time instant, anyone of the spots containing a two may be selected in each column, and at a third instant any one of the spots containing a three may be selected in each column. Thus, using this strategy, any one of a first ⅓ of the spots in each column is illuminated in a first timeslot of a repetitive Time Division Multiple Access (TDMA) frame period; any one of a second ⅓ of the spots in each column may be selected during a second timeslot; and any one of a third ⅓ of the spots in each column may be selected in a third timeslot. At any instant, which of the allowed spots in a column, or fan, that is actually selected may depend for example on the backlog of traffic for that particular spot. If no traffic exists for a spot, it is of course not a candidate to be selected. If a data packet destined for a user in a particular spot has been waiting in a queue for a period of time longer than data packets destined for other spots belonging to the same timeslot reuse group, then that spot would be preferentially selected within the column for illumination at the earliest opportunity, i.e., upon the next occurrence of its timeslot.

The above-described regular reuse pattern effectively creates three major queues, and each queue receives one out of three timeslots, exactly ⅓ of the transmit capacity, in which to transmit traffic whether needed or not. Within each queue, each column or fan of cells disposes of the capacity of one transmit beam, whether needed or not. Occasionally, this could lead to inefficiency where the transmit capacity available for one column of cells was not used while the traffic demands in another column of cells temporarily exceeded the capacity available for that column. This so-called trunking loss is the penalty one must pay for dividing up transmission into three timeslots of fixed size.

Other reuse patterns can be used when such inefficiency is encountered and cannot be tolerated. For example, a larger number of timeslots that are a multiple of the reuse pattern size can be defined, such as twelve timeslots (4×3) in the present example of a three-cell pattern. Each reuse group may be visited up to four timeslots out of twelve in the case of equal traffic demand per group. However, if there is one cell that demands the largest amount of traffic flow, then the reuse group containing that cell may be allocated more than four out of twelve timeslots by reducing the number of timeslots to less than four for another reuse group. This is equivalent to varying the original timeslot sizes away from exactly ⅓ of the frame in discrete steps of 1/12 of the frame period to better adapt to the traffic pattern.

Another exemplary use pattern is to transmit, during the next fraction of a frame period, to a spot for which a data packet has been queued longest. That spot is located in a particular row in a particular column, and referring to FIG. 11, we may not then transmit simultaneously in either of the adjacent spots in adjacent rows in that column. All other spots in the adjacent rows of that column are however candidates for receiving a signal. Selection among the candidates in the adjacent rows is based on the length of time packets have been waiting for delivery in those spots. Having selected one spot in each of the adjacent rows, this disallows two spots in each of the next-adjacent rows from being served at the same time. All others are, however, possible candidates for selection and are selected once more upon packet delivery backlog. This method continues until one spot in each row of a column has been selected to receive service at the next timeslot. While these packets are being delivered, the scheduler, which may form part of the router 88, determines the spots that shall receive service in the following timeslot. This method is not constrained to a fixed reuse plan, and therefore offers more flexibility in servicing a very unequal traffic demand for different cells.

Figure 12:
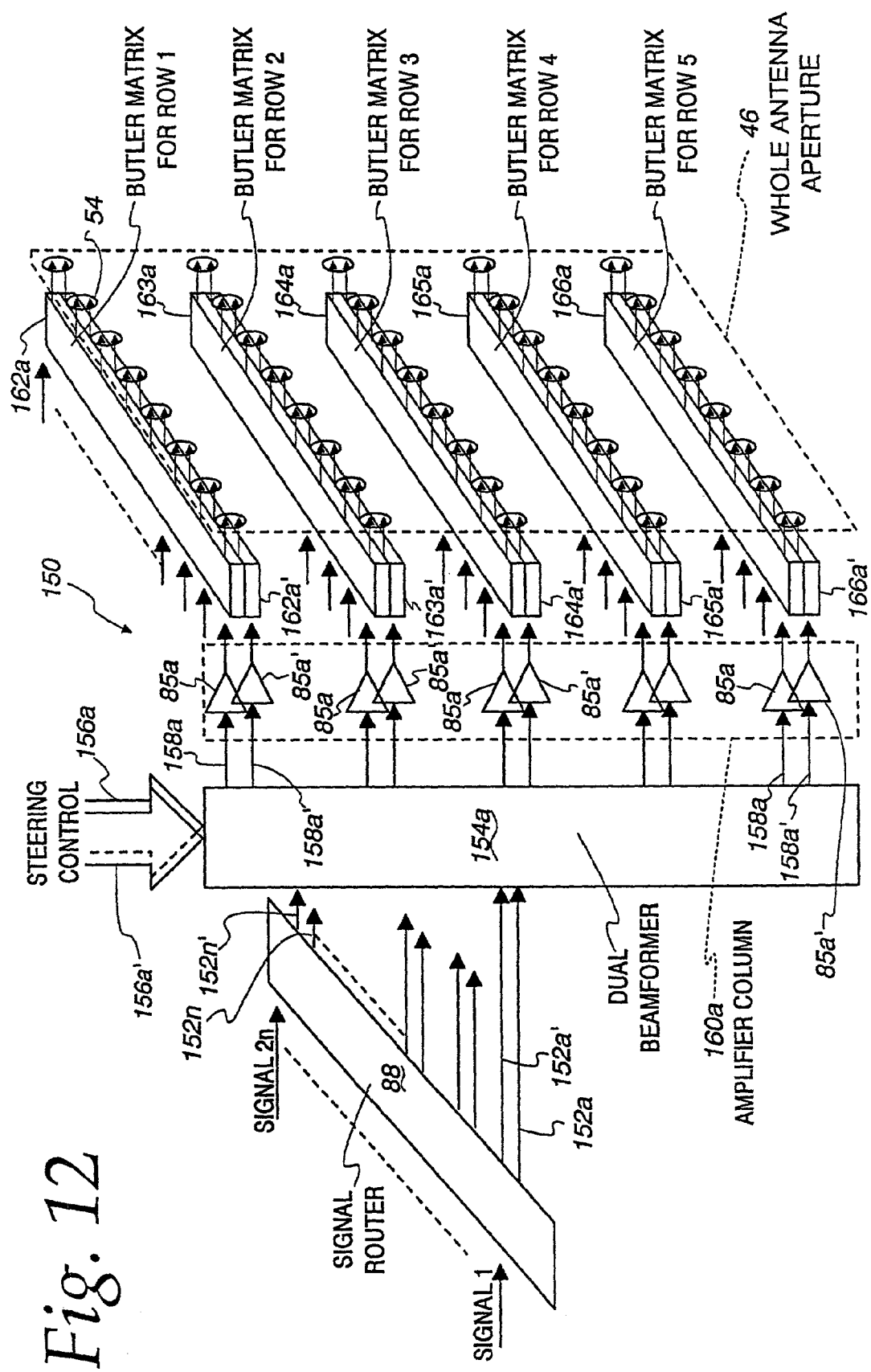
FIG. 12 illustrates still another embodiment of an active phased array transmitter.

The inventive transmitter may also be constructed using both polarizations to transmit twice as many simultaneous beams from the same antenna aperture. Referring to FIG. 12, such a dual-polarization transmitter, indicated generally as 150, is depicted. The signal router 88 receives the incoming signals 1-2n and routes respective signal pairs 152a, 152a'–152n, 152n' to corresponding dual beamformers 154a–152n. The dual beamformers 154a–154n each include first and second steering control inputs receiving beam steering control signals 156a, 156a'–156n, 156n' for the first and second polarizations, respectively. The dual beamformers 154a–154n receive input signals 152a, 152a'–152n, 152n, and generate corresponding pairs of output drive signals 158a, 158a'–158n, 158n' to columns 160a–160n of amplifier pairs 85a, 85a'. For clarity purposes, only dual beamformer 154a and column 160a of amplifier pairs 85a, 85a' is depicted in FIG. 12.

While operation of transmitter 150 will be described with respect to dual beamformer 154a and amplifier column 160a, it should be understood that the other beamformers 154b–154n and associated amplifier columns 160b–160n operate in the same manner. The dual beamformer 154a applies the output drive signal pairs 158a, 158a' to corresponding amplifier pairs 85a, 85a' in amplifier column 160a, which in turn supply the signals to a corresponding input of Butler matrix pairs 162a, 162a'–166a, 166a'.

As in the prior art of FIG. 3, dual-polarization antenna elements 54 are distributed over a two-dimensional antenna aperture 46. Each element 54 has a connection for transmitting an RHC polarized signal and a separate connection for transmitting an LHC polarized signal, however, vertical and horizontal polarizations may also be used. All of the RHC connections for a row of elements 54 are then connected to the outputs of an RHC Butler matrix 162a, while all the LHC connections for a row of elements 54 are connected to a similar LHC Butler matrix 162a'. Other Butler matrix pairs are connected to the antenna elements 54 in a similar manner.

The transmitter 150 operates in the same manner as previously described with respect to the transmitter 80 of FIG. 5, except that now twice as many signals may be transmitted utilizing both RHC and LHC element connections. Further, similar to FIG. 5, the number of amplifier pair columns 160a–160n and dual beamformers 154a–154n are equal to the number of Butler matrix input pairs.

Assuming sufficient polarization isolation can be achieved to allow the same frequency to be used twice in the same location at the same time with opposite polarizations, then the reuse pattern of FIG. 11 can be used for both polarizations. In this case, each spot may be illuminated with either RHC or LHC polarization, or both, at the same time. This implies that user terminals in every location are somehow divided into those receiving service via RHC polarization and those receiving service via LHC polarization. Preferably, the polarization can be fixed for each terminal to avoid the extra complexity of being able to receive polarizations.

When very high frequencies such as 20–30 GHz are used for communication, polarization corruption can take place due to the presence of non-spherical water droplets in the atmosphere, thus reducing the amount of polarization isolation. In that case, it may be insufficient to rely entirely upon polarization isolation, and instead utilizing partly polarization isolation and partly spacial isolation may be necessary. With reference to FIG. 11, assuming that the shaded spots are being illuminated by RHC polarization during timeslot 1, the intervening spots labelled "2" may be receiving service using LHC polarization. That is, the spots which are illuminated by RHC in timeslot 2 may be illuminated by LHC in timeslot 1. Likewise, the spots which are illuminated by RHC in timeslot 3 may be illuminated by LHC in timeslot 2, and the spots which were illuminated by RHC in timeslot 1 may be eliminated by LHC in timeslot 3. Since the two polarizations are never used in the same place at the same time, this pattern does not rely entirely upon polarization isolation to prevent co-channel interference. Both RHC and LHC polarizations may also be used without the constraint of a regular reuse pattern such as shown in FIG. 11.

As previously described, a scheduler (170 in FIG. 13) determines the spot that has the greatest traffic backlog to receive priority treatment during the next available timeslot. This principle can be extended to determining which spot and polarization has the greatest backlog in the case where user terminals are only configured for one polarization at a time and thus must be served with a specific polarization. The scheduler 170 thus determines which of the two polarizations will be used first to serve the chosen spot in the next timeslot. The scheduler 170 then continues as before to determine one spot in each of the other rows, excluding the use of adjacent spots in adjacent rows, that can receive service at the same time using that same polarization. Independently, the scheduler 170 can determine the spot which has the greatest backlog for service using the opposite polarization, excluding the spots already determined to receive service using the first polarization in order to avoid using both polarizations in the same place at the same time.

Efficiency may result in determining the spots that shall receive RHC service and the spots that shall simultaneously receive LHC service in an interleaved manner, instead of determining all RHC spots first followed by all LHC spots. First, the spot and polarization having the greatest backlog is determined. Then, the spot having the greatest backlog for service with the opposite polarization is determined, excluding the first spot if it is desired to avoid use of both polarizations in the same spot at the same time. Next, the spot having the next greatest backlog is determined, excluding the already determined spots and spots adjacent to those that use the same polarization, but not excluding adjacent spots that use the opposite polarization, and excluding columns containing an already determined spot needing the same polarization, as only one beam per column per polarization can be created. It should be understood that many other variations of scheduler strategies can be implemented by a person of ordinary skill in the art without departing from the spirit and scope of the present invention, and it is not an objective herein to provide an exhaustive list of all possibilities based on the principle of scheduling traffic based on demand while avoiding use of both polarizations in the same place at the same time.

In yet another implementation, the polarization used to serve a particular spot or region on the earth is fixed to be either RHC or LHC. User terminals sold and installed in a particular region would then be equipped to receive only the designated polarization for that region. The entire surface of the earth would be mapped to LHC and RHC regions in an interleaved manner. For example, alternate columns or fans of spots in FIGS. 10A–10D could be designated as LHC and RHC respectively. Then the pattern of service which was disallowed in FIG. 10D would no longer be disallowed, as adjacent spots in different columns would employ opposite polarizations. This allows for a simpler scheduler algorithm since the spot to serve during a particular timeslot can be decided independently for each column of cells without reference to the choice in other columns of cells. The algorithm thus reduces to determining the cell in each column having the greatest traffic backlog.

Other regular frequency or timeslot reuse patterns exist, of a size given by integers of the form $i^2+j^2-ij$. For example, with $i=1$, $j=2$ this expression evaluates to 3, confirming that a regular 3-cell pattern exists. With $i=j=2$, a regular 4-cell pattern exists. Other regular cell pattern sizes are 7, 9, 12, 13, 16, etc.

As is generally known in the art, the size of a cell used in a satellite communication system can advantageously be much smaller than the main-lobe beam diameter produced by the phased array antenna/transmitter. A cell can be defined to lie only around the gain peak of the antenna beam and not down to the −4 dB edge, as was previously customary. However, the spacing of cells using the same channel must be chosen with regard to the antenna's beamwidth and thus its ability to discriminate radiation coming from different angles. By defining small cells that occupy only the beam peak, the co-channel cell spacing can be reduced as user terminals will not now lie at worst case beam edge locations. The co-channel cell spacing can then be reduced to approximately two times the beam radius, where beam radius is measured at the −4.5 dB point relative to beam peak, when a cell occupies the area only out to ¼ the cell radius from beam center. Since a cell is then only ¼ of the area of the beam's −4.5 dB coverage, a 16-cell pattern is required to cover the whole surface area with different cells within the 16-cell cluster not employing the same frequency resource at the same time. Since reuse distance, i.e., the distance between cells using the same frequency resource at the same time, is reduced by this technique, the system capacity defined in traffic per square kilometer is increased. Thus, the use of larger or smaller reuse patterns does not determine system capacity for multi-beam satellite communication systems, but rather the reuse distance. The reuse distance is minimized, thus maximizing system capacity when a reuse pattern size is large and the cell size is small, as is generally known in the art.

When, in addition to frequency and time, polarization is introduced at a resource, there is an interest in defining a resource reuse pattern that includes frequency, time and polarization. Since there are only two orthogonal polarizations, the product of the number of frequencies, timeslots and polarizations available will always be even, thus suggesting the use of one of the even-sized reuse patterns such as 4, 12 or 16. For example, a system having two timeslots combined with two polarizations can be employed instead of the 3-timeslot×2-polarization system previously discussed with respect to FIG. 11. Thus, a four-cell reuse pattern could be created by assigning one of the four resources (t1, RHC), (t1, LHC), (t2,RHC), (t2,LHC) to cells in a fixed manner. For example, (t1,RHC) can be alternated with (t2,RHC) up the first column or fan of FIG. 11, thus making the entire column RHC. The second column of cells may be assigned to use (t1,LHC) alternating with (t2,LHC), thus making the second column or fan entirely LHC, and so on alternating the polarization used between successive columns or fans of cells. In this manner, not only is the polarization fixed for a user terminal in a fixed location, but also the ½ of the frame period in which it shall receive is also fixed, thus reducing its receiving processing and allowing it to transmit in the remaining half period. This may avoid simultaneous transmit and receive, which can be problematic for low cost terminals. With a larger reuse pattern, such as an 8-timeslot× 2-polarization (a 16-cell pattern), each receiver only receives a single polarization for ⅛ of the time, further reducing complexity in processing.

When a number of beams that a satellite can simultaneously create is limited due to use of single-signal power amplifiers for intermodulation reasons, each beam, when created, should transmit with the maximum data rate possible, that is, the single carrier signal in the beam should be modulated with the highest information rate possible that fits within the total allocated band. Power limitations may prevent the maximum data rate from being used, in which case the frequency band can be divided into a number of lower information rate channels which can be combined with timeslots and polarizations in a joint reuse plan. The inventive multi-beam transmitter allows different beams to transmit different frequencies, and allows transmission of two frequencies even in the same fan using different polarizations.

Figure 13:
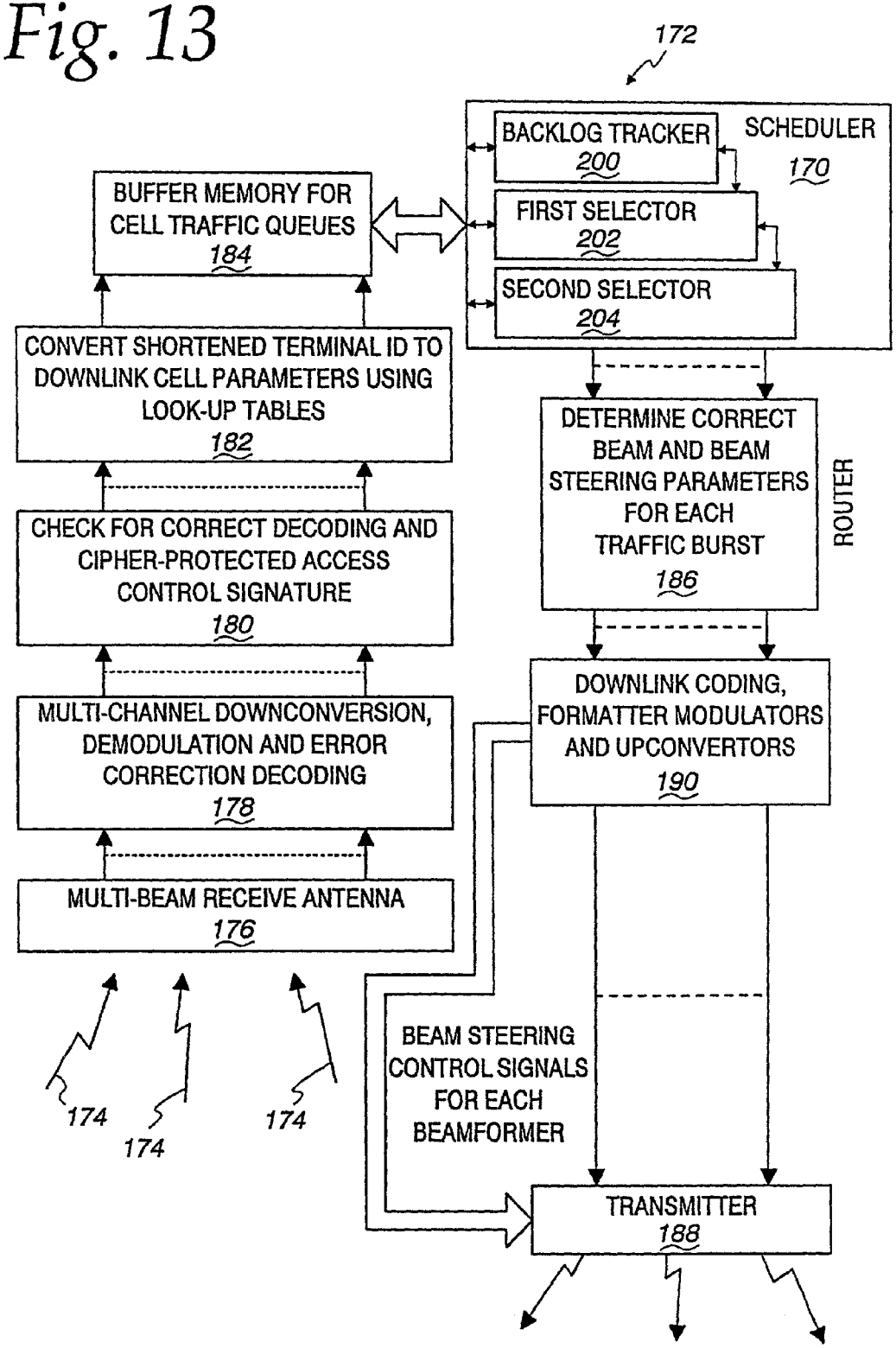
FIG. 13 depicts a block diagram of a satellite directional transponder incorporating the active phased array transmitter.

Referring now to FIG. 13, a block diagram of a satellite communications transponder, indicated generally as 172, embodying the inventive multi-beam transmitter is depicted. Signals 174 are received from terrestrial terminals or other satellites (not shown) by a multi-beam receive antenna 176. Unlike the antenna used for transmission, the receive antenna 176 is not restricted to receive single frequency channels at a time because the low level received signals do not challenge the linearity of the receive amplifier components. U.S. Pat. Nos. 5,539,730 and 5,566,168 to applicant, which are herein incorporated by reference, disclose that different access protocols may therefore be in order for the uplink as compared to the downlink. For example, multiple narrow frequency channels combined with few, long timeslots (narrowband TDMA) can be advantageous for the uplink by reducing the user terminal peak transmit power requirement. Wideband TDMA having few or only one frequency channel combined with many, short timeslots is however beneficial for the downlink as it allows efficient class-C amplifiers to be used without causing intermodulation.

When different uplink and downlink formats are used, and direct terminal-to-terminal communication via the satellite relay is employed, then the satellite must perform format conversion on board. One simplified method of converting narrowband TDMA to wideband TDMA is described in U.S. patent application Ser. No. 08/581,110, filed Dec. 29, 1995 to applicant, which is herein incorporated by reference. The method of the above-identified application includes sampling narrowband received signals at a rate at least equal to the Nyquist rate, storing the samples temporarily in a buffer during an uplink timeslot, then bursting out the buffer contents at a higher rate during a shorter downlink slot, thereby increasing the downlink TDMA bandwidth by a given factor. Access control is provided in the above-identified application by a central ground station that orchestrates the creation of cipher keys in common between the two communicating terminals, which are envisaged to be of telephone type that operate mainly in one-on-one communications. For Internet terminals, however, the terminal with which a given terminal wishes to communicate data to or from is not necessarily fixed for a given session. It is therefore impractical to establish a session key for each possible pairing of terminals. On the other hand, if terminals use different session keys, then decryption and re-encryption of traffic must be performed on board the satellite. This suggests that the satellite transponder 172 will need to be of the demodulate-remodulate type.

Consequently, block 178 in FIG. 11 provides multi-channel down conversion, demodulation and error correction decoding for all uplink traffic. The output of block 178 is in the form of binary bits or data symbols that are fed into an access control unit 180. Access control unit 180 may check that a Cyclic Redundancy Check (CRC) code, which is a function of all data bits, has been decoded properly, and reject any traffic packets with uncorrected errors. The CRC code and other fields of the traffic bursts may in fact be enciphered using a session key established for the originating terminal during an initial logon procedure. The logon procedure can involve communication between a central network control computer located on the satellite or on the ground, during which the network can issue a random challenge and receive an authentication response from the terminal to authenticate it as a genuine subscriber, a byproduct of this process being the creation of a temporary session key. A temporary abbreviated terminal identity code may also be issued for the session to reduce overhead in the packet data headers. Conventional authentication processes are described in U.S. Pat. Nos. 5,091,942, 5,282,250, 5,390,245 and 5,559,886, all of which are herein incorporated by reference.

Thus, access control block 180 can include verification that the packet was transmitted by a authenticated subscriber who can be billed for the communications service provided. If a packet contains decoding errors or cannot be verified to have been transmitted by an authentic user, it will not be relayed by the satellite and will not consume any capacity resources. A method for verifying authenticity needs to be designed taking into account all known methods of fraud, such as authentication with the unwitting help of a known terminal, eavesdropping on authentic transmissions to determine a valid code, etc.

The most secure method to prevent fraud is to encipher data packet headers and payload together using a block cipher such as DES prior to error-correction coding, such that the transmitted signature is not based on just the session key and the terminal ID, which do not change, but also on the data content or payload, which does change. Thus, the only way to cause the satellite to relay a false packet would be to repeat the entire packet, which has no utility to fraudster. Moreover, this could, if necessary, be prevented by including a real time clock identification in each packet to establish a limited window of validity. The same packet transmitted later with an out-of-date clock value would thus be rejected. The real time clock value can, for example, be a frame counter value that counts TDMA frame periods of the system, as is already known to be useful for enciphering from U.S. Pat. Nos. 5,148,485 and 5,060,266 to applicant.

At block 182, the destination terminal ID's contained in the packet headers are related to the position or cell in which the destination terminal is located. In principle, this information could already be converted to beam parameters for downlink transmission, however, packets are not necessarily transmitted instantaneously, but are queued in buffer memory 184 for a short time, during which the satellite may have moved. Consequently, the derivation of beam steering parameters by the router occurs at block 186 immediately prior to transmission.

As previously discussed, a preferred concept of routing and scheduling for the downlink is to maintain separate queues for data packets destined for each cell. Scheduler 170 receives packets from the queue buffer memory 184 using any of the above-discussed strategies. For example, if a subset of cells is to be visited by the downlink beams during the next timeslot, then the scheduler 170 only considers packets destined for cells within that subset. After selecting the packets for simultaneous transmission, the exact beam steering parameters for each beam are determined by the router at block 186.

More specifically, the scheduler 170 includes a backlog tracker 200 determining a waiting time for each data packet, the waiting time indicative of how long each data packet has waited in the buffer memory 184 for transmission. A first selector 202 selects the data packet that has been waiting the longest, as indicated by the backlog tracker 200. A second selector 204 further selects data packets for simultaneous transmission in descending order of waiting time. The second selector 204 skips data packets requiring a transmit direction incompatible with the direction of transmission of a data packet previously selected for transmission at the same time. For example, a transmit direction may be deemed incompatible by the second selector 204 if: 1) it can only be created using a directional transmission beam that will be fully occupied in transmitting an already selected data packet; or 2) it lies too close in direction to the direction of transmission of a data packet already selected for transmission at the same time. A direction too close in direction to another direction may be one in which an angular separation of the directions is less than a minimum value sufficient to avoid mutual interference. Such minimum angular separation may include a first separation when the polarizations of the transmission used in each direction are the same, and a second separation when the polarizations of transmission used in each direction are different.

In order for the scheduler 170 to work properly, the scheduler 170 must first determine a subset of directions in which the directed beams can be transmitted in a next transmission. Then, by mapping a destination identifier code stored with each data packet to a corresponding beam direction, the scheduler 170, via first and second selectors 202, 204, selects only data packets whose destinations map to a direction within the subset of directions. The first and second selectors 202, 204 order the selected data packets according to how long they have been stored in the buffer memory 184, with the selected data packets which have been stored the longest ordered first.

An indication flag may be set in the buffer memory 184 in association with the selected data packets already transmitted, and/or the selected data packets which have been transmitted may be deleted from the buffer memory 184, releasing memory locations in the buffer memory 184 so as to provide storage capacity for new data packets.

Block 186 may contain routing information for routing a signal to a particular fan. The routing information may be updated from the ground network control computer at a relatively slow rate, while signals for steering the spot beam within a selected fan may be generated in real time with the aid of an on-board clock and systematic update procedures that compensate for satellite movement. Some interaction between packet selection from buffer memory 184 and determination of the fan in which the destination lies may be required for the scheduler 170 to function correctly, due to the fact that only one beam of each polarization may be created per fan, combined with the fact that fan coverage areas on the ground do not comprise straight lines or columns of cells, but are rather curved due to geometrical distortion. Therefore, it may be logical to perform the determination of which fan each packet will be transmitted to at block 182, which is possible due to the slower speed at which this parameter changes due to satellite movement when the preferred array orientation is employed, i.e., direction of electronic steering along the satellite's ground track with direction of switched fan selection across the ground track.

The beam steering parameters for each beam are determined for the packet to be transmitted in the selected fan and communicated to the beamformer dealing with that fan and polarization. The beamformers, power amplifiers, Butler matrices and dual polarization antenna elements of the various embodiments previously described may be included within transmitter block 188 of FIG. 10. Block 190 comprises downlink burst formatting, error correction coding, modulation and upconversion to the allocated downlink frequency band for transmission. Downlink formatting can comprise multiplexing the destination ID's for all packets destined for terminals in the same cell separately from the payloads destined for those terminals, such that user terminals do not have to continually demodulate data at the generally high transmission bit rate and further omit decoding of non-intended messages sent to the terminal.

While the invention has been described with particular reference to the drawings, it should be understood that various modifications could be made without departing from the spirit and scope of the present invention.

The invention claimed is:

1. A scheduler for selecting data packets from a buffer memory to be transmitted in a next time period using multiple directional transmission beams controllable in direction, said scheduler comprising:
   a backlog tracker determining a waiting time for each data packet,
   said waiting time indicative of how long each data packet has waited in the buffer memory for transmission;
   a first selector for selecting the data packet that has been waiting the longest as indicated by the backlog tracker; and
   a second selector selecting further data packets for simultaneous transmission in descending order of waiting time, said second selector skipping data packets requiring a transmit direction incompatible with the direction of transmission of a data packet previously selected for transmission at a same time.

2. The scheduler of claim 1, wherein a transmit direction is deemed incompatible by the second selector if it can only be created using a directional transmission beam that will be fully occupied in transmitting an already selected data packet.

3. The scheduler of claim 1, wherein a transmit direction is deemed incompatible by the second selector if it lies too close in direction to the direction of transmission of a data packet already selected for transmission at the same time.

4. The scheduler of claim 3, wherein a direction too close in direction to another direction is one in which an angular separation of said directions is less than a minimum value sufficient to avoid mutual interference.

5. The scheduler of claim 4, wherein the minimum angular separation sufficient to avoid mutual interference is a first separation when the polarizations of the transmission used in each direction are the same, and a second separation when the polarizations of transmission used in each direction are different.

6. A scheduling method for selecting data packets from a buffer memory for transmission by a phased array antenna comprising at least one directive beam, in a time-division reuse pattern, comprising:
   determining a subset of directions in which said directive beam can be transmitted in a next transmission;
   mapping a destination identifier code stored with each said data packet to a corresponding beam direction and selecting only data packets whose destinations map to a direction within said subset of directions;
   ordering said selected data packets accordering to how long they have been stored in said buffer memory, with said selected data packets which have been stored the longest ordered first; and
   transmitting the selected data packet that has been stored the longest first by directing the beam to the direction associated with that data packet, in response to the ordering.

7. The scheduling method of claim 6 further including the step of deleting the selected data packets from the buffer memory which have been transmitted.

8. The scheduling method of claim 6 further including the step of setting an indication flag in the buffer memory in association with the selected data packets already transmitted.

9. The scheduling method of claim 6, further comprising the step of releasing memory locations in the buffer memory where the selected data packets that have been transmitted were stored so as to provide storage capacity for new data packets.

* * * * *